US011341655B2

(12) United States Patent
Fan et al.

(10) Patent No.: US 11,341,655 B2
(45) Date of Patent: May 24, 2022

(54) IMAGE PROCESSING METHOD, IMAGE PROCESSING APPARATUS AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Qingwen Fan, Beijing (CN); Bin Zhao, Beijing (CN); Yukun Sun, Beijing (CN); Jinghua Miao, Beijing (CN); Xuefeng Wang, Beijing (CN); Wenyu Li, Beijing (CN); Jinbao Peng, Beijing (CN); Jianwen Suo, Beijing (CN); Xi Li, Beijing (CN); Zhifu Li, Beijing (CN); Lili Chen, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 95 days.

(21) Appl. No.: 16/538,091

(22) Filed: Aug. 12, 2019

(65) Prior Publication Data
US 2020/0265587 A1    Aug. 20, 2020

(30) Foreign Application Priority Data

Feb. 19, 2019    (CN) .......................... 201910122830.4

(51) Int. Cl.
*G06T 7/246*    (2017.01)
*G06T 3/00*    (2006.01)
(Continued)

(52) U.S. Cl.
CPC ............ *G06T 7/246* (2017.01); *G06T 3/0093* (2013.01); *G06T 5/50* (2013.01); *G06T 13/80* (2013.01);
(Continued)

(58) Field of Classification Search
CPC ......... G06T 7/246; G06T 3/0093; G06T 5/50; G06T 13/80; G06T 19/006; G09G 5/363
(Continued)

(56) References Cited

U.S. PATENT DOCUMENTS

2014/0354515 A1\* 12/2014 LaValle ................ G02B 27/017
345/8
2015/0348509 A1\* 12/2015 Verbeure ................... G06T 1/20
345/213
(Continued)

FOREIGN PATENT DOCUMENTS

CN    106385625 A    2/2017
CN    106658170 A    5/2017
(Continued)

OTHER PUBLICATIONS

First Office Action for Chinese Application No. 201910122830.4, dated Apr. 16, 2020, 7 Pages.

*Primary Examiner* — Hai Tao Sun
(74) *Attorney, Agent, or Firm* — Brooks Kushman P.C.

(57) ABSTRACT

An image processing method according to some embodiments of the present disclosure includes: obtaining rendering durations of images of M frames; determining whether the rendering durations of the images of the M frames match a motion gesture requirement; if yes, controlling a difference $\Delta t$ between a rendering start timing of the image of each frame and a warp processing start timing of the image of a corresponding frame to be less than or equal to a preset difference $\Delta t_{aim}$; otherwise, setting a system frame rate to
(Continued)

make the rendering duration of the image of each frame match the motion gesture requirement.

15 Claims, 8 Drawing Sheets

(51) Int. Cl.
  *G06T 13/80*  (2011.01)
  *G06T 5/50*  (2006.01)
  *G06T 19/00*  (2011.01)
  *G09G 5/36*  (2006.01)
(52) U.S. Cl.
  CPC ........... *G06T 19/006* (2013.01); *G09G 5/363* (2013.01); *G09G 2340/0435* (2013.01)

(58) Field of Classification Search
  USPC .......................................................... 345/581
  See application file for complete search history.

(56) References Cited

U.S. PATENT DOCUMENTS

| | | | |
|---|---|---|---|
| 2017/0243324 A1* | 8/2017 | Mierle | .................... G06T 11/60 |
| 2017/0352325 A1* | 12/2017 | Spence | ................ G09G 3/3618 |
| 2019/0043448 A1* | 2/2019 | Thakur | ................ G02B 27/017 |
| 2019/0279427 A1 | 9/2019 | Tang et al. | |

FOREIGN PATENT DOCUMENTS

| | | |
|---|---|---|
| CN | 106683034 A | 5/2017 |
| CN | 107220925 A | 9/2017 |

* cited by examiner

IMAGE PROCESSING METHOD, IMAGE PROCESSING APPARATUS AND DISPLAY DEVICE

CROSS-REFERENCE TO RELATED APPLICATION

This application claims priority to Chinese Patent Application No. 201910122830.4 filed on Feb. 19, 2019, which is incorporated herein by reference in its entirety.

TECHNICAL FIELD

The present disclosure relates to the field of image processing technology, and in particular to an image processing method, an image processing apparatus, and a display device.

BACKGROUND

Virtual Reality (VR) is a computer simulation method in which a virtual world can be created and experienced. When performing VR display, users can immerse themselves in an immersive environment provided by the VR display, giving the users more realistic use experience.

In order to reduce VR image delay, it is common to use an Asynchronous TimeWarp (ATW) technique. The ATW technique is an intermediate frame generating method in which an image rendering process and a time warping (TW) process are arranged on two separate threads, and can effectively reduce the image delay and alleviate head vertigo caused by the VR image delay. At present, when the immersive environment provided by the VR display device presents a scene that is less complicated, its rendering requires a relatively short time, but the time when a graphics processor completes the image rendering is relatively late, resulting in a relatively long latency time for the TW process of a next frame. In addition, when the immersive environment provided by the VR display device presents a scene that is more complicated, its rendering requires a relatively long time, resulting in a long time for the graphics processor to render the image. Consequently, the time warping (abbreviated as TW) of the image cannot be carried out in a timely manner, resulting in a delay of the VR image displayed by the VR display device. In this case, when the user changes the head gesture quickly, the VR image seen by the user is shaken, and then head vertigo problem occurs.

SUMMARY

In a first aspect, embodiments of the present disclosure provide an image processing method, including: obtaining rendering durations of images of M frames; determining whether the rendering durations of the images of the M frames match a motion gesture requirement; if yes, controlling a difference $\Delta t$ between a rendering start timing of the image of each frame and a warp processing start timing of the image of a corresponding frame to be less than or equal to a preset difference $\Delta t_{aim}$; otherwise, setting a system frame rate to make the rendering duration of the image of each frame match the motion gesture requirement.

According to some possible embodiments of the present disclosure, the determining whether the rendering durations of the images of the M frames match the motion gesture requirement includes: determining whether the rendering durations of n % or more of the images of the M frames are less than or equal to $$\frac{1}{fps},$$

where fps is the system frame rate, and n is an integer greater than or equal to 50; if yes, confirming that the rendering durations of the images of the M frames match the motion gesture requirement; otherwise, confirming that the rendering durations of the images of the M frames do not match the motion gesture requirement.

According to some possible embodiments of the present disclosure, prior to the controlling the difference $\Delta t$ between the rendering start timing of the image of each frame and the warp processing start timing of the image of the corresponding frame to be less than or equal to the preset difference $\Delta t_{aim}$, the image processing method further includes: acquiring an average rendering duration t1_average of the images of the M frames from the rendering durations of the images of the M frames; obtaining warp processing durations of the images of the M frames, and acquiring an average warp processing duration t2_average of the images of the M frames from the warp processing durations of the images of the M frames; the controlling the difference $\Delta t$ between the rendering start timing of the image of each frame and the warp processing start timing of the image of the corresponding frame to be less than or equal to the preset difference $\Delta t_{aim}$ includes: if a sum $t_0$ of the average rendering duration t1_average of the images of the M frames and the average warp processing duration t2_average of the images of the M frames is less than or equal to $$\frac{1}{fps},$$

where fps is the system frame rate, setting the rendering start timing of the image of each frame to be the same as a receiving timing of a corresponding vertical sync signal, and setting the warp processing start timing of the image of each frame to make the difference $\Delta t$ between the rendering start timing of the image of each frame and the warp processing start timing of the image of the corresponding frame greater than or equal to the average rendering duration t1_average of the images of the M frames and less than or equal to the preset difference $\Delta t_{aim}$, where $$\Delta t_{aim} = \frac{1}{fps} - t2\_average;$$

and if the sum $t_0$ of the average rendering duration t1_average of the images of the M frames and the average warp processing duration t2_average of the images of the M frames is greater than $$\frac{1}{fps},$$

setting the rendering start timing of the image of each frame to be the same as the receiving timing of the corresponding vertical sync signal, and setting the warp processing start timing of the image of each frame to make the difference $\Delta t$ between the rendering start timing of the image of each frame and the warp processing start timing of the image of the corresponding frame greater than or equal to the average rendering duration t1_average of the images of the M frames and less than or equal to the preset difference $\Delta t_{aim}$, which is smaller than $\Delta t\_average$, where $\Delta t\_average$ is an average value of a plurality of differences, each of which is a difference between the rendering start timing of each of the images of the M frames and the warp processing start timing of a corresponding frame of the images of the M frames.

According to some possible embodiments of the present disclosure, prior to the controlling the difference $\Delta t$ between the rendering start timing of the image of each frame and the warp processing start timing of the image of the corresponding frame to be less than or equal to the preset difference $\Delta t_{aim}$, the image processing method further includes: acquiring an average rendering duration t1_average of the images of the M frames from the rendering durations of the images of the M frames; obtaining warp processing durations of the images of the M frames, and acquiring an average warp processing duration t2_average of the images of the M frames from the warp processing durations of the images of the M frames; the controlling the difference $\Delta t$ between the rendering start timing of the image of each frame and the warp processing start timing of the image of the corresponding frame to be less than or equal to the preset difference $\Delta t_{aim}$ includes: if a sum $t_0$ of the average rendering duration t1_average of the images of the M frames and the average warp processing duration t2_average of the images of the M frames is less than or equal to $$\frac{1}{fps},$$

where fps is the system frame rate, setting the warp processing start timing of the image of each frame to make the difference $\Delta t$ between the rendering start timing of the image of each frame and the warp processing start timing of the image of the corresponding frame greater than or equal to the average rendering duration t1_average of the images of the M frames and less than or equal to the preset difference $\Delta t_{aim}$, which is smaller than $\Delta t\_average$, where $\Delta t\_average$ is an average value of a plurality of differences, each of which is a difference between the rendering start timing of each of the images of the M frames and the warp processing start timing of a corresponding frame of the images of the M frames; and if the sum $t_0$ of the average rendering duration t1_average of the images of the M frames and the average warp processing duration t2_average of the images of the M frames is greater than $$\frac{1}{fps},$$

setting the rendering start timing of the image of each frame to be the same as the receiving timing of the corresponding vertical sync signal, and setting the warp processing start timing of the image of each frame to make the difference $\Delta t$ between the rendering start timing of the image of each frame and the warp processing start timing of the image of the corresponding frame greater than or equal to the average rendering duration t1_average of the images of the M frames and less than or equal to the preset difference $\Delta t_{aim}$, which is smaller than $\Delta t\_average$, where $\Delta t\_average$ is an average value of a plurality of differences, each of which is a difference between the rendering start timing of each of the images of the M frames and the warp processing start timing of a corresponding frame of the images of the M frames.

According to some possible embodiments of the present disclosure, subsequent to the obtaining the rendering durations of the images of the M frames and prior to the determining whether the rendering durations of the images of the M frames match the motion gesture requirement, the image processing method further includes: acquiring an average rendering duration t1_average of the images of the M frames from the rendering durations of the images of the M frames; the setting the system frame rate to make the rendering duration of the image of each frame match the motion gesture requirement includes: setting the system frame rate to be equal to the average rendering duration t1_average of the images of the M frames to make the warp processing start timing of the image of each frame the same as a rendering end timing of the image of a corresponding frame.

According to some possible embodiments of the present disclosure, prior to the determining whether the rendering durations of the images of the M frames match the motion gesture requirement, the image processing method further includes: setting a system target frame rate to be equal to the average rendering duration t1_average of the images of the M frames; the setting the system frame rate to be equal to the average rendering duration t1_average of the images of the M frames includes: looking up display driving parameters from a display driving parameter index table according to the system target frame rate; and adjusting the system frame rate based on the display driving parameters to make the system frame rate equal to $$\frac{1}{t1\_average}.$$

According to some possible embodiments of the present disclosure, prior to the determining whether the rendering durations of the images of the M frames match the motion gesture requirement, the image processing method further includes: determining whether the average rendering duration t1_average of the images of the M frames is less than 1/K, where K is a system frame rate threshold; and if yes, performing the determining whether the rendering durations of the images of the M frames match the motion gesture requirement.

According to some possible embodiments of the present disclosure, after the controlling the difference $\Delta t$ between the rendering start timing of the image of each frame and the warp processing start timing of the image of the corresponding frame to be less than or equal to the preset difference $\Delta t_{aim}$, or after the setting the system frame rate to make the rendering duration of the image of each frame match the motion gesture requirement, the image processing method further includes updating the rendering durations of the images of the M frames.

In a second aspect, embodiments of the present disclosure further provide an image processing apparatus including: a duration obtaining circuit, configured to obtain rendering durations of images of M frames; a match determining circuit, configured to determine whether the rendering durations of the images of the M frames match a motion gesture requirement; a first modulating circuit, configured to control a difference $\Delta t$ between a rendering start timing of the image of each frame and a warp processing start timing of the image of a corresponding frame to be less than or equal to a preset difference $\Delta t_{aim}$ when the rendering durations of the images of the M frames match the motion gesture requirement; and a second modulating circuit, configured to set a system frame rate to make the rendering duration of the image of each frame match the motion gesture requirement.

According to some embodiments of the present disclosure, the match determining circuit is further configured to determine whether the rendering durations of n % or more of the images of the M frames are less than or equal to $$\frac{1}{fps},$$

where fps is the system frame rate, and n is an integer greater than or equal to 50.

According to some embodiments of the present disclosure, the image processing apparatus further includes: a state confirming circuit, configured to confirm that the rendering durations of the images of the M frames match the motion gesture requirement if the rendering durations of n % or more of the images of the M frames are less than or equal to $$\frac{1}{fps},$$

and to confirm that the rendering durations of the images of the M frames do not match the motion gesture requirement if the rendering durations of n % or more of the images of the M frames is greater than $$\frac{1}{fps}.$$

According to some embodiments of the present disclosure, the duration obtaining circuit is further configured to, prior to controlling the difference $\Delta t$ between the rendering start timing of the image of each frame and the warp processing start timing of the image of the corresponding frame to be less than or equal to the preset difference $\Delta t_{aim}$, obtain warp processing durations of the images of the M frames, acquire an average rendering duration t1_average of the images of the M frames from the rendering durations of the images of the M frames, and acquire an average warp processing duration t2_average of the images of the M frames from the warp processing durations of the images of the M frames.

According to some embodiments of the present disclosure, the first modulating circuit is further configured to:

if a sum $t_0$ of the average rendering duration t1_average of the images of the M frames and the average warp processing duration t2_average of the images of the M frames is less than or equal to $$\frac{1}{fps},$$

where fps is the system frame rate, set the rendering start timing of the image of each frame to be the same as a receiving timing of a corresponding vertical sync signal, and set the warp processing start timing of the image of each frame to make the difference $\Delta t$ between the rendering start timing of the image of each frame and the warp processing start timing of the image of the corresponding frame greater than or equal to the average rendering duration t1_average of the images of the M frames and less than or equal to the preset difference $\Delta t_{aim}$, where $$\Delta t_{aim} = \frac{1}{fps} - t2\_average;$$

and if the sum $t_0$ of the average rendering duration t1_average of the images of the M frames and the average warp processing duration t2_average of the images of the M frames is greater than $$\frac{1}{fps},$$

set the rendering start timing of the image of each frame to be the same as the receiving timing of the corresponding vertical sync signal, and set the warp processing start timing of the image of each frame to make the difference $\Delta t$ between the rendering start timing of the image of each frame and the warp processing start timing of the image of the corresponding frame greater than or equal to the average rendering duration t1_average of the images of the M frames and less than or equal to the preset difference $\Delta t_{aim}$, which is smaller than $\Delta t\_average$, where $\Delta t\_average$ is an average value of a plurality of differences, each of which is a difference between the rendering start timing of each of the images of the M frames and the warp processing start timing of a corresponding frame of the images of the M frames.

According to some embodiments of the present disclosure, the first modulating circuit is further configured to:

if a sum $t_0$ of the average rendering duration t1_average of the images of the M frames and the average warp processing duration t2_average of the images of the M frames is less than or equal to $$\frac{1}{fps},$$

where fps is the system name rate, set the warp processing start timing of the image of each frame to make the difference $\Delta t$ between the rendering start timing of the image of each frame and the warp processing start timing of the image of the corresponding frame greater than or equal to the average rendering duration t1_average of the images of the M frames and less than or equal to the preset difference $\Delta t_{aim}$, which is smaller than $\Delta t\_average$, where $\Delta t\_average$ is an average value of a plurality of differences, each of which is a difference between the rendering start timing of each of the images of the M frames and the warp processing start timing of a corresponding frame of the images of the M frames; and if the sum $t_0$ of the average rendering duration t1_average of the images of the M frames and the average warp processing duration t2_average of the images of the M frames is greater than $$\frac{1}{fps},$$

set the rendering start timing of the image of each frame to be the same as the receiving timing of the corresponding vertical sync signal, and set the warp processing start timing of the image of each frame to make the difference Δt between the rendering start timing of the image of each frame and the warp processing start timing of the image of the corresponding frame greater than or equal to the average rendering duration t1_average of the images of the M frames and less than or equal to the preset difference $Δt_{aim}$, which is smaller than Δt_average, where Δt_average is an average value of a plurality of differences, each of which is a difference between the rendering start timing of each of the images of the M frames and the warp processing start timing of a corresponding frame of the images of the M frames.

According to some possible embodiments of the present disclosure, the duration obtaining circuit is further configured to acquire an average rendering duration t1_average of the images of the M frames from the rendering durations of the images of the M frames, subsequent to obtaining the rendering durations of the images of the M frames and prior to determining whether the rendering durations of the images of the M frames match the motion gesture requirement.

According to some possible embodiments of the present disclosure, the second modulating circuit is further configured to set the system frame rate to be equal to the average rendering duration t1_average of the images of the M frames to make the warp processing start timing of the image of each frame the same as a rendering end timing of the image of a corresponding frame.

According to some possible embodiments of the present disclosure, the second modulating circuit is further configured to set a system target frame rate to be equal to the average rendering duration t1_average of the images of the M frames, look up display driving parameters from a display driving parameter index table according to the system target frame rate, and adjust the system frame rate based on the display driving parameters to make the system frame rate equal to $$\frac{1}{t1\_average}.$$

According to some possible embodiments of the present disclosure, the image processing apparatus further includes a frame rate selecting circuit, configured to determine whether the average rendering duration t1_average of the images of the M frames is less than 1/K, where K is a system frame rate threshold, prior to determining whether the rendering durations of the images of the M frames match the motion gesture requirement; and the match determining circuit is further configured to determine whether the rendering durations of the images of the M frames match the motion gesture requirement if the system frame rate is less than or equal to K.

According to some possible embodiments of the present disclosure, the image processing apparatus further includes an update control circuit configured to control the updating of the rendering durations of the images of the M frames, after controlling the difference Δt between the rendering start timing of the image of each frame and the warp processing start timing of the image of the corresponding frame to be less than or equal to the preset difference $Δt_{aim}$, or after setting the system frame rate to make the rendering duration of the image of each frame match the motion gesture requirement.

In a third aspect, embodiments of the present disclosure further provide a display device that includes an image processing apparatus as described in the second aspect.

BRIEF DESCRIPTION OF THE DRAWINGS

The accompanying drawings described herein are intended to provide a further understanding of the present disclosure, and constitute a part of the present disclosure. The exemplary embodiments of the present disclosure and description thereof are intended to explain the present disclosure and not to constitute undue limitations thereof. In the drawings.

REFERENCE SIGNS

Figure 1:
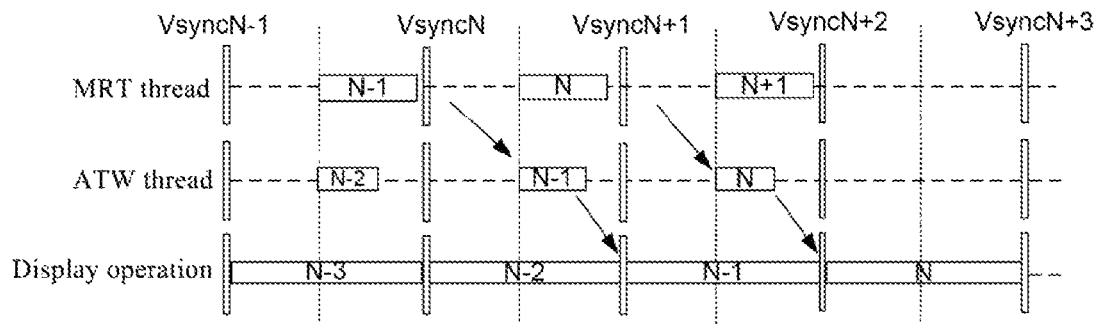
FIG. 1 is a first schematic diagram showing first ATW-based image processing in related art.

| | |
|---|---|
| 100-duration obtaining circuit | 200-frame rate selecting circuit; |
| 300-match determining circuit | 400-state confirming circuit; |
| 500-update control circuit | 600-first modulating circuit; |
| 700-second modulating circuit | 800-duration determining circuit; |
| 910-transceiver | 920-memory; |
| 930-processor | 940-bus; |
| VsyncN − 1- vertical sync signal of $(N - 1)^{th}$ frame; | |
| VsyncN − 1- vertical sync signal of $N^{th}$ frame; | |
| VsyncN + 1- vertical sync signal of $(N + 1)^{th}$ frame; | |
| VsyncN + 2- vertical sync signal of $(N + 2)^{th}$ frame; | |
| VsyncN + 3- vertical sync signal of $(N + 3)^{th}$ frame; | |

DETAILED DESCRIPTION

The technical solutions in the embodiments of the present disclosure are clearly and completely described hereinafter in conjunction with the accompanying drawings in the embodiments of the present disclosure. Apparently, the described embodiments are only a part, rather than all, of the embodiments of the present disclosure. Based on these embodiments of the present disclosure, all other embodiments obtained by a person of ordinary skill in the art without exercising any inventive skill fall within the scope of the present disclosure.

An existing VR display device includes a graphics card responsible for rendering a VR image, and a display responsible for displaying the VR image which has been rendered by the graphics card. The faster a rendering speed the graphics card has, the more the number of frames of the VR images is, and the more VR images the graphics card transmits to the display. When the display has a high refresh rate, the display displays more VR images. Specifically, when the number of frames of images is higher than the refresh rate, a frame output speed of the graphics card is higher than the refresh rate of the display, so that the display cannot process the outputted image frames in a timely manner, and tearing (break-up) occurs in the image of each frame displayed by the display. Meanwhile, when the display cannot process the outputted image frame in a timely manner, the VR image outputted by the graphics card cannot be completely displayed by the display, resulting in frame loss. For example, if the graphics card renders 100 pictures per second (100 frames per second), and the display can display only 60 images per second (for example, the refresh rate of the display is 60 Hz), then a user can only see 60 images which have been rendered by the graphics card, and the remaining 40 images cannot be displayed by the display. As a result, the graphics card has done some useless work to a certain extent and the image displayed on the display has a frame loss problem. If the number of frames of images is lower than the refresh rate, the display not only can display all the images rendered by the graphics card, but can also display an image of one frame in at least two consecutive frames, which is called "an image jitter phenomenon". Therefore, only when the refresh rate of the display matches the number of frames of VR images, the screen can present smooth VR images, giving the user an enhanced visual experience.

In order to cooperate with some scenes displayed by an immersive environment provided by the VR display device, a user will perform human-computer interaction with the VR display device through head movement, so that he/she can enjoy a real use experience. Due to the limitation of the rendering capability of the graphics processor of the VR display device, in the case where some scenes presented by the immersive environment are complicated, image jitter and image delay will occur for the image displayed on the display if the user moves his/her head at a faster speed and the number of frames of images is lower than the refresh rate. For example, if the user keeps his/her head still, the image jitter phenomenon will not cause discomfort to the user; and if the user rotates his/her head from a previous position to a current new position, the image jitter phenomenon will cause an image of a current frame displayed by the display to still be the image when the user's head was at the previous position. At this time, the user's brain reaction has switched to the new position, but the image information received by the eyes is still the image information of the previous position. In this case, the image information received by the eyes does not match the image information recognized by the brain. This gives the user a feeling of vertigo; moreover, the greater the angle of rotation of the head is, the more intense the feeling of vertigo will be.

Time warping (TW) is a technique for image frame correction, which warps an image of a previous frame to obtain an image of a current frame, and sends the obtained image of the current frame to a display, so as to alleviate the head vertigo caused by the image delay problem. In general, a method used in the warp processing is a direction-based warp processing technique which can correct rotation change gesture of the head, and which has significant warping effect on two-dimensional images, and does not need to occupy too many system resources. For example, for complicated scenes, the direction-based warp processing technique can generate an image of a current frame based on less data throughput. Specifically, before a vertical sync signal of the current frame is received, the graphics card needs to complete the TW processing of an image of the previous frame to obtain the image of the current frame, so as to ensure that after the sync signal of the current frame is received, the display can display the image of the current frame to prevent the image delay problem from occurring during the head rotation. That is, within an image rendering duration of one frame, it is necessary to complete the current frame image rendering operation (rendering operation) and the current frame image TW processing operation (TW operation) in sequence so as to ensure that the display can display the TW processed image of the current frame in a next frame.

The image rendering process and the time warping process of the existing TW technology are carried out in a same thread, so that they cannot be carried out simultaneously. If the graphics card has relatively low performance, it cannot complete the current frame image rendering operation and the current frame image TW processing operation in sequence within the rendering duration of one frame. As an improvement of the TW technique, an Asynchronous Time Warp (ATW) technique is an intermediate frame generating technique which not only can reduce the image delay, but can also solve the problem of head vertigo. Moreover, in the case where the graphics card has relatively low performance, it can complete the current frame image rendering operation and the current frame image TW processing operation within the rendering duration of one frame. Specifically, the ATW technique is a technique in which the rendering operation and the TW operation occur on two threads to adapt to the performance of the graphics card, so as to avoid the image delay and reduce image jitter. In addition, the thread on which the rendering operation occurs is defined as an MRT thread, and the thread on which the TW operation occurs is defined as an ATW thread.

Conventionally, the rendering operation of an image of a current frame and the TW processing of an image of a previous frame start in an intermediate timing of an image rendering duration of the same frame. This will be illustrated in conjunction with FIGS. 1 to 3.

Figure 2:
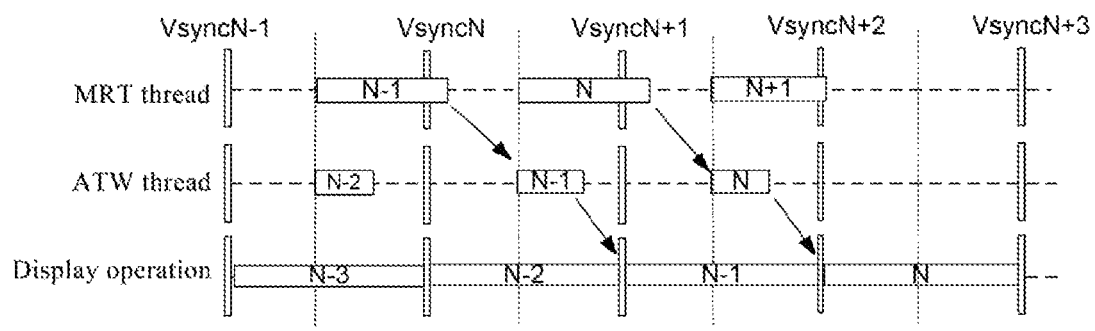
FIG. 2 is a second schematic diagram showing the first ATW-based image processing in the related art.
Figure 3:
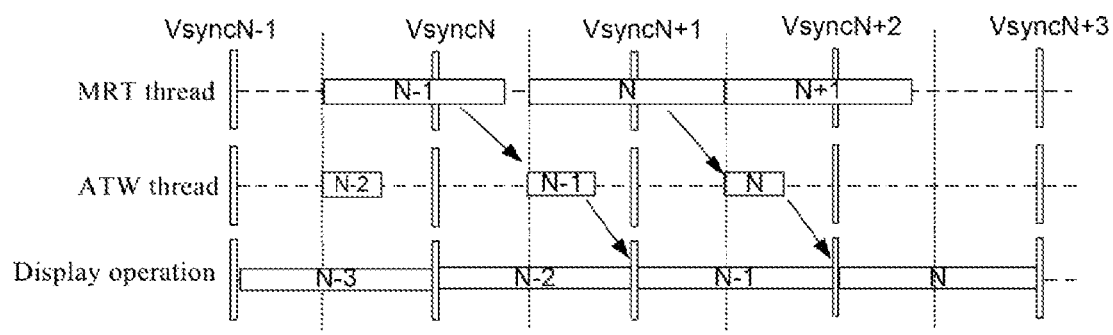
FIG. 3 is a third schematic diagram showing the first ATW-based image processing in the related art.

FIGS. 1 to 3 are schematic diagrams showing a first ATW-based image processing process, with VsyncN−1, VsyncN, VsyncN+1, VsyncN+2, and VsyncN+3 representing a vertical sync signal of an $(N-1)^{th}$ frame, a vertical sync signal of an $N^{th}$ frame, a vertical sync signal of an $(N+1)^{th}$ frame, a vertical sync signal of an $(N+2)^{th}$ frame, and a vertical sync signal of an $(N+3)^{th}$ frame, respectively. A timing at which the vertical sync signal of the $(N-1)^{th}$ frame is received is defined as a start timing of the $(N-1)^{th}$ frame, a timing at which the vertical sync signal of the $N^{th}$ frame is received is defined as an end timing of the $(N-1)^{th}$ frame or a start timing of the $N^{th}$ frame, a timing at which the vertical sync signal of the $(N+1)^{th}$ frame is received is defined as an end timing of the $N^{th}$ frame or a start timing of the $(N+1)^{th}$ frame, a timing at which the vertical sync signal of the $(N+2)^{th}$ frame is received is defined as an end timing of the $(N+1)^{th}$ frame or a start timing of the $(N+2)^{th}$ frame, and a timing at which the vertical sync signal of $(N+3)^{th}$ frame is received is defined as an end timing of the $(N+2)^{th}$ frame or a start timing of the $(N+3)^{th}$ frame.

An intermediate timing between the start timing of the $(N-1)^{th}$ frame and the end timing of the $(N-1)^{th}$ frame is defined as an intermediate timing of the $(N-1)^{th}$ frame; at the intermediate timing of the $(N-1)^{th}$ frame, the rendering of the image of the $(N-1)^{th}$ frame is started, and the TW processing of the image of the $(N-2)^{th}$ frame is also started to obtain the image of the $(N-1)^{th}$ frame (i.e., the image of the $(N-2)^{th}$ frame after having been subjected to the image processing), so as to ensure that between the start timing of the $N^{th}$ frame and the end timing of the $N^{th}$ frame, the display can display the image of the $(N-1)^{th}$ frame (the image of the $(N-2)^{th}$ frame after having been subjected to the TW processing) during the display operation. An intermediate timing between the start timing of the $N^{th}$ frame and the end timing of the $N^{th}$ frame is defined as an intermediate timing of the $N^{th}$ frame; at the intermediate timing of the $N^{th}$ frame, the rendering of the $N^{th}$ frame image is started, and the TW processing of the image of the $(N-1)^{th}$ frame that has been rendered is also started to obtain the image of the $N^{th}$ frame (i.e., the image of the $(N-1)^{th}$ frame after having been subjected to the image processing), so as to ensure that between the start timing of the $(N+1)^{th}$ frame and the end timing of the $(N+1)^{th}$ frame, the display can display the image of the $N^{th}$ frame (the image of the $(N-1)^{th}$ frame after having been subjected to the TW processing) during the display operation. An intermediate timing between the start timing of the $(N+1)^{th}$ frame and the end timing of the $(N+1)^{th}$ frame is defined as an intermediate timing of the $(N+1)^{th}$ frame; at the intermediate timing of the $(N+1)^{th}$ frame, the rendering of the $(N+1)^{th}$ frame is started, and the TW processing of the image of the $N^{th}$ frame that has been rendered is also started to obtain the image of the $(N+1)^{th}$ frame (i.e., the image of the $N^{th}$ frame after having been subjected to the image processing), so as to ensure that between the start timing of the $(N+2)^{th}$ frame and the end timing of the $(N+2)^{th}$ frame (i.e., the start timing of the $(N+3)^{th}$ frame), the display can display the image of the $(N+1)^{th}$ frame (the image of the $(N+3)^{th}$ frame after having been subjected to the TW processing) during the display operation.

It can be understood that the rendering duration of an image of each frame cannot exceed a difference between the start timings of two adjacent frames to ensure that an image content displayed by the display during each frame display operation is different. For example, the rendering duration of the image of the $(N-1)^{th}$ frame, the rendering duration of the image of the $N^{th}$ frame, and the rendering duration of the image of the $(N+1)^{th}$ frame shown in FIG. 1 are all less than one-half of the difference between the start timings of the two adjacent frames. On the other hand, the rendering duration of the image of the $(N-1)^{th}$ frame, the rendering duration of the image of the $N^{th}$ frame, and the rendering duration of the image of the $(N+1)^{th}$ frame shown in FIGS. 2 and 3 are all greater than one-half of the difference between the start timings of two adjacent frames and less than the difference between the start timings of the two adjacent frames.

Figure 4:
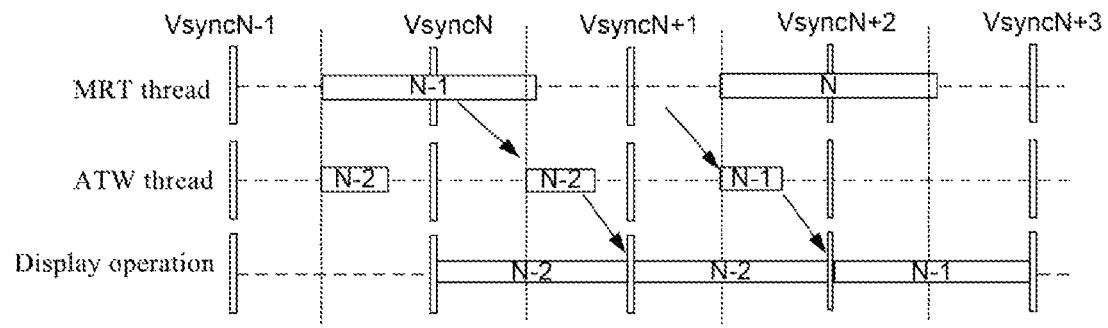
FIG. 4 is a schematic diagram showing second ATW-based image processing in the related art.

If the rendering duration of an image of each frame exceeds the difference between the start timings of two adjacent frames, the display will display the same image content in at least two consecutive frame display operations, that is, image delay occurs, causing the user to have problems such as vertigo during the head rotation. For example, as shown in FIG. 4, the rendering of an image of an $(N-1)^{th}$ frame is started at an intermediate timing of the $(N-1)^{th}$ frame, and a rendering duration of the image of the $(N-1)^{th}$ frame exceeds the difference between start timings of vertical sync signals of two adjacent frames, so that at the intermediate timing of the $N^{th}$ frame, the rendering of the image of the $(N-1)^{th}$ frame has not yet been finished. As a result, an image of the $N^{th}$ frame cannot be rendered at the intermediate timing of the $N^{th}$ frame, and its rendering can be started only at the intermediate timing of the $(N+1)^{th}$ frame, causing the graphics card to render the images discontinuously. At the same time, since the rendering of the image of the $(N-1)^{th}$ frame is still not finished at the intermediate timing of the $N^{th}$ frame, only TW processing of an image of the $(N-2)^{th}$ frame can be started at the intermediate timing of the $N^{th}$ frame, causing the display to display the TW-processed image of the $(N-2)^{th}$ frame in both the $N^{th}$ and $(N+1)^{th}$ frame display operations. Similarly, when the rendering duration of the image of the $N^{th}$ frame exceeds the difference between the start timings of two adjacent frames, referring to the rendering analysis of the image of the $(N-1)^{th}$ frame, the display device displays the image of the $(N-1)^{th}$ frame in the $(N+2)^{th}$ frame display operation accordingly.

It can be understood that when performing the rendering of a VR image, it is necessary to render the VR image based on rendering parameters of the VR image, which include rendering resolution, angle of view, and user gesture information. Among them, the angle of view and the user gesture information can realize texture render of the VR image, and especially for VR images of a complicated scene, the scene complexity and rendering resolution play decisive roles in the rendering durations of the VR images. When performing TW processing, it is necessary to process image information according to the user gesture information so as to implement time warp processing on the image information.

By analyzing the image processing of a display device at 60 fps and 75 fps and comparing statistics results of times required for the image rendering operation and the TW operation, the inventors found that the time required for the image rendering operation accounts for a very large proportion in the image processing time, and that for the TW operation accounts for a very small proportion therein. Based on this, embodiments of the present disclosure provide an image processing method and an image processing apparatus to adaptively adjust a frame rate of the graphics card, so as to improve a utilization efficiency of the graphics processor and reduce the delay of the VR image displayed by the VR display device. The details will be set forth below with reference to the drawings.

As shown in FIGS. 5 to 11, the image processing method provided by the embodiment of the present disclosure includes the following steps.

At step S100, rendering durations of images of M frames are counted, where M can be set according to calculation requirements, but M is generally an integer greater than or equal to 10, for example, M=30, in order to enable the counting result to be more accurate.

At step S400, whether the rendering durations of the images of the M frames match a motion gesture requirement is determined.

If yes, it indicates that image information currently processed by the graphics card is relatively simple, durations required for rendering the images are relatively short, image contents of two adjacent frames displayed by the display device are different, and the image delay problem will not occur. Furthermore, in ATW-based image processing, the rendering operation and the TW operation occur on two threads in parallel, so that there is no preference in order between the rendering operation and the TW operation. At this time, step S500 is performed.

Otherwise, it indicates that the image information currently processed by the graphics card is complicated, durations required for the rendering is prolonged, and the image delay problem can occur. At this time, step S600 is performed.

At step S500, a difference $\Delta t$ between a rendering start timing of the image of each frame and a warp processing start timing of the image of a corresponding frame is controlled to be less than or equal to a preset difference $\Delta t_{aim}$.

For example, at an intermediate timing of an $(N-1)^{th}$ frame, the image rendering of the $(N-1)^{th}$ frame matches the motion gesture requirement, indicating that the display device has no image delay problem when displaying the image. At this time, the rendering start timing of the image of the $(N-1)^{th}$ frame and/or the warp processing start timing of the image of the $(N-1)^{th}$ frame can be set, so that the difference $\Delta t$ between the rendering start timing of the image of each frame and the warp processing start timing of the image of a corresponding frame is less than or equal to the preset difference $\Delta t_{aim}$ to shorten a latency time of TW processing of the image of the $(N-1)^{th}$ frame.

At step S600, a system frame rate is set so that the rendering duration of the image of each frame matches the motion gesture requirement.

For example, in the ATW-based image processing process, the rendering of the image of the $(N-1)^{th}$ frame and the TW processing of the image of the $(N-2)^{th}$ frame are started at the intermediate timing of the $(N-1)^{th}$ frame, but since the scene for the $(N-1)^{th}$ frame image is complicated, the image of the $(N-1)^{th}$ frame takes a long time to render (more than 1/fps, where fps is the system frame rate), which makes it impossible to start the TW processing of the image of the $(N-1)^{th}$ frame at the intermediate timing of the $N^{th}$ frame. At this time, the rendering duration of the image of the $(N-1)^{th}$ frame cannot match the motion gesture, indicating that the rendering duration of the image of the $(N-1)^{th}$ frame has negatively affected the display of images on the display, so that the display displays the same image in two consecutive frames. Based on this, the frame rate per frame can be set such that image contents displayed by the display in two adjacent frames are different.

As can be seen from the specific process of the image processing control method described above, when the rendering durations of the images of the M frames match the motion gesture requirement, the rendered image of the current frame which is being subjected to the TW processing is the rendered image of a preceding frame, and when the user changes his/her head gesture rapidly, the VR image seen by the user will not jitter. At this time, the difference $\Delta t$ between the rendering start timing of the image of each frame and the warp processing start timing of the image of the corresponding frame can be controlled to be less than or equal to the preset difference $\Delta t_{aim}$ so as to reduce the latency time of the TW processing of the image of the current frame. As a result, the utilization efficiency of the graphics processor is improved. On the contrary, when the rendering durations of the images of the M frames do not match the motion gesture requirement, the rendered images of the two adjacent frames which are subjected to the TW processing are the same, so that when the user changes his/her head gesture rapidly, the VR images seen by the user jitter, and the user thus has the head vertigo problem. Based on this, the system frame rate is set so that the rendering duration of the image of each frame matches the motion gesture requirement, which can alleviate the head vertigo problem caused by the VR image delay.

Figure 12:
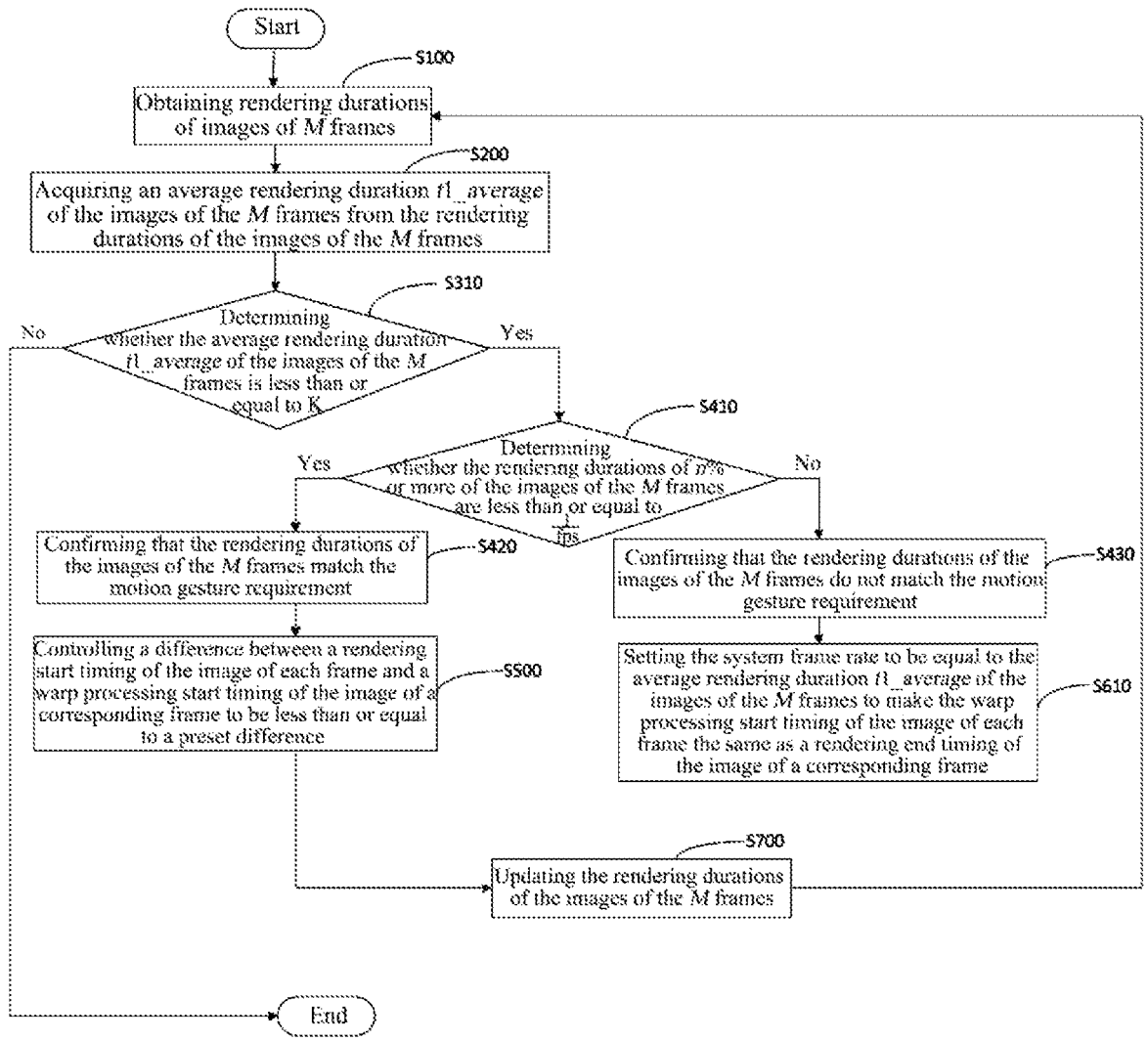
FIG. 12 is a second flowchart showing an image processing method according to some embodiments of the present disclosure.

In some embodiments, as shown in FIG. 12, determining whether the rendering durations of the images of the M frames match the motion gesture requirement includes steps S410 to S430.

At step S410, whether the rendering durations of n % or more of the images of the M frames are less than or equal to $$\frac{1}{fps}$$

(where fps is the system frame rate) is determined.

If yes, step S420 is performed. Otherwise, step S430 is performed.

At step S420, it is confirmed that the rendering durations of the images of the M frames match the motion gesture requirement.

At step S430, it is confirmed that the rendering durations of the images of the M frames do not match the motion gesture requirement.

As can be seen from the above, the rendering durations of the images of the M frames can be determined statistically. When it is determined that the rendering durations of n % or more of the images are less than or equal to $$\frac{1}{fps},$$

it can be considered that all the rendering durations of the images of the M frames match the motion gesture, and at this time the difference Δt between the rendering start timing of the image of each frame and the warp processing start timing of the image of the corresponding frame can be controlled to be less than or equal to the preset difference $\Delta t_{aim}$. When it is determined that the rendering durations of n % or more of the images are greater than $$\frac{1}{fps},$$

the image delay problem will occur, causing the image rendering durations to fail to match the motion gesture.

As for a value of n, it can be set according to actual needs. For example, n can be an integer greater than or equal to 50. Of course, the larger the value of n is, the more accurate a counting result is, but the larger a corresponding counting amount of data is. Therefore, the value of n should not be too large, and is generally between 50 and 65.

Figure 13:
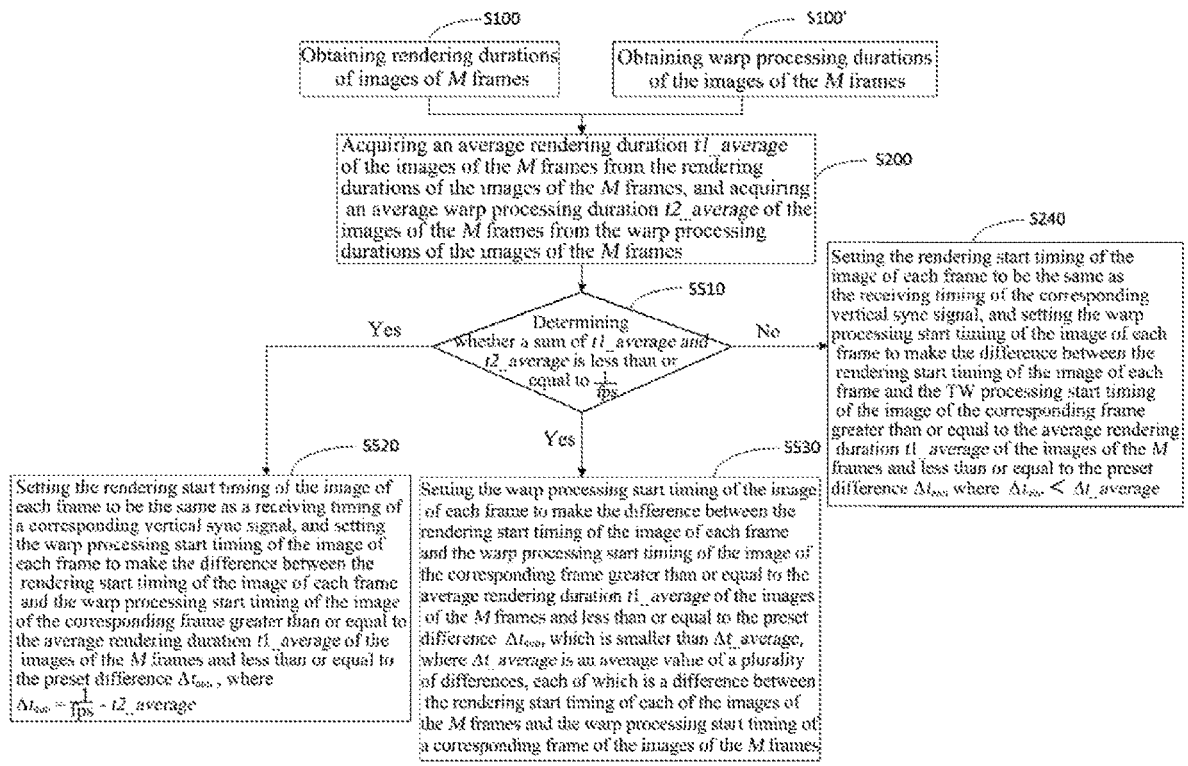
FIG. 13 is a third flowchart showing an image processing method according to some embodiments of the present disclosure.

Further, as shown in FIG. 13, the controlling the difference Δt between the rendering start timing of the image of each frame and the warp processing start timing of the image of the corresponding frame to be less than or equal to the preset difference $\Delta t_{aim}$ includes the following steps.

At step S510, it is determined whether a sum $t_0$ of the average rendering duration t1_average of the images of the M frames and the average warp processing duration t2_average of the images of the M frames is less than or equal to $$\frac{1}{fps}.$$

If the sum $t_0$ of the average rendering duration t1_average of the images of the M frames and the average warp processing duration t2_average of the images of the M frames is less than or equal to $$\frac{1}{fps},$$

it indicates that in the ATW-based image processing, the rendering operation of the image of each frame and the TW operation of the image of the corresponding frame can be controlled to be completed within one frame, or within two frames. At this time, step S520 or step S530 is performed.

If the sum $t_0$ of the average rendering duration t1_average of the images of the M frames and the average warp processing duration t2_average of the images of the M frames is greater than $$\frac{1}{fps},$$

and $t_0$ is generally less than $$\frac{2}{fps},$$

it indicates that in the ATW-based image processing, the rendering operation of the image of each frame and the TW operation of the image of a corresponding frame can be controlled not to be completed within one frame, but completed within two frames only. At this time, step S240 is performed.

At step S520, the rendering start timing of the image of each frame is set to be the same as a receiving timing of a corresponding vertical sync signal, and the warp processing start timing of the image of each frame is set to make the difference Δt between the rendering start timing of the image of each frame and the warp processing start timing of the image of the corresponding frame greater than or equal to the average rendering duration t1_average of the images of the M frames and less than or equal to the preset difference $\Delta t_{aim}$, where $$\Delta t_{aim} = \frac{1}{fps} - t2\_average$$

Figure 5:
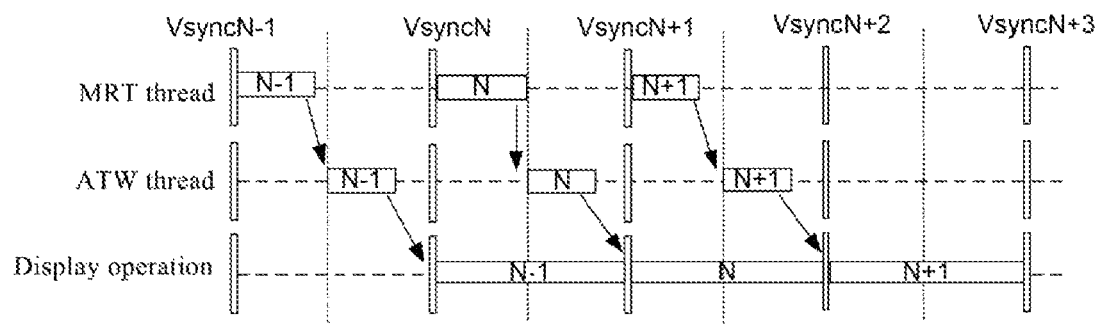
FIG. 5 is a first schematic diagram showing first ATW-based image processing according to some embodiments of the present disclosure.

A rendering duration of the image of each frame shown in FIGS. 1 and 5 is less than 0.5/fps, and the sum $t_0$ of the average rendering duration t1_average of the images of the M frames and the average warp processing duration t2_average of the images of the M frames is less than or equal to $$\frac{1}{fps}.$$

Figure 6:
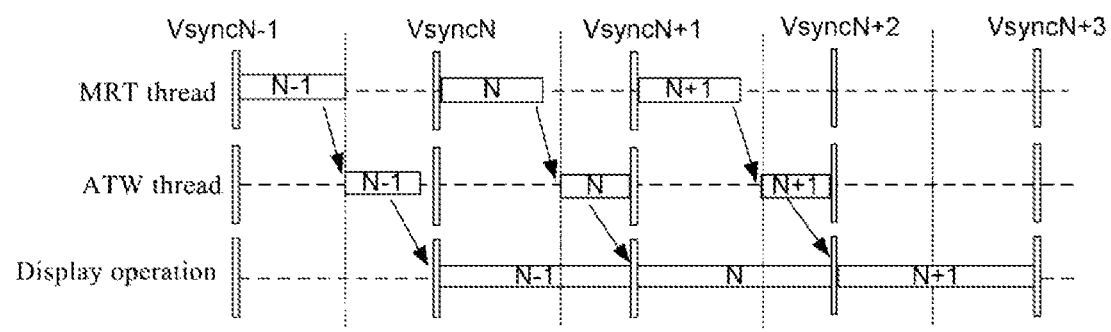
FIG. 6 is a second schematic diagram showing the first ATW-based image processing according to some embodiments of the present disclosure.

A rendering duration of the image of each frame shown in FIGS. 2 and 6 is greater than 0.5/fps and less than 1/fps, and the sum $t_0$ of the average rendering duration t1_average of the images of the M frames and the average warp processing duration t2_average of the images of the M frames is less than or equal to $$\frac{1}{fps}.$$

In FIGS. 1 and 2, the intermediate timing of the $(N-2)^{th}$ frame is the same as the rendering start timing of the image of the $(N-2)^{th}$ frame, and the TW processing start timing of the image of the $(N-2)^{th}$ frame is the intermediate timing of the $(N-1)^{th}$ frame as shown in FIGS. 1 and 2, that is, the difference between the rendering start timing of the image of the $(N-2)^{th}$ frame and the TW processing start timing of the image of the $(N-2)^{th}$ frame is 1/fps. In FIG. 5, a receiving timing of the vertical sync signal of the $(N-2)^{th}$ frame is the same as the rendering start timing of the image of the $(N-2)^{th}$ frame, and the intermediate timing of the $(N-2)^{th}$ frame is the same as the TW processing start timing of the image of the $(N-2)^{th}$ frame, so that the difference between the rendering start timing of the image of the $(N-2)^{th}$ frame and the TW processing start timing of the image of the $(N-2)^{th}$ frame is 0.5/fps, where $$t1\_average \leq 0.5/fps \leq \frac{1}{fps} \cdot t2\_average.$$

In FIG. 6, considering that in the ATW-based image processing process, the rendering operation and the TW operation occur on different threads so that the receiving timing of the vertical sync signal of the $(N-2)^{th}$ frame is the same as the rendering start timing of the image of the $(N-2)^{th}$ frame, the TW processing start timing of the image of the $(N-2)^{th}$ frame is controlled such that the difference between the rendering start timing of the image of the $(N-2)^{th}$ frame and the TW processing start timing of the image of the $(N-2)^{th}$ frame is less than $$\Delta t_{aim} = \frac{1}{fps} - t2\_average,$$

so as to ensure that the rendering operation of the image of the $(N-2)^{th}$ frame and the TW processing of the image of the $(N-2)^{th}$ frame are completed within the time of one frame.

Similarly, in FIGS. 1 and 2, the intermediate timing of the $(N-1)^{th}$ frame is the same as the rendering start timing of the image of the $(N-1)^{th}$ frame, and the TW processing start timing of the image of the $(N-1)^{th}$ frame is the intermediate timing of the $N^{th}$ frame, that is, the difference between the rendering start timing of the image of the $(N-1)^{th}$ frame and the TW processing start timing of the image of the $(N-1)^{th}$ frame is 1/fps. In FIG. 5, the receiving timing of the vertical sync signal of the $(N-1)^{th}$ frame is the same as the rendering start timing of the image of the $(N-1)^{th}$ frame, and the intermediate timing of the image of the $(N-1)^{th}$ frame is the same as the TW processing start timing of the image of the $(N-1)^{th}$ frame, so that the difference between the rendering start timing of the image of the $(N-1)^{th}$ frame and the TW processing start timing of the image of the $(N-1)^{th}$ frame is 0.5/fps. In FIG. 6, considering that in the ATW-based image processing process, the rendering operation and the TW operation occur on different threads so that the receiving timing of the vertical sync signal of the $(N-1)^{th}$ frame is the same as the rendering start timing of the image of the $(N-1)^{th}$ frame, the TW processing start timing of the image of the $(N-1)^{th}$ frame is controlled such that the difference between the rendering start timing of the image of the $(N-1)^{th}$ frame and the TW processing start timing of the image of the $(N-1)^{th}$ frame is less than $$\Delta t_{aim} = \frac{1}{fps} \cdot t2\_average,$$

to ensure that the rendering operation of the image of the $(N-1)^{th}$ frame and the TW processing of the image of the $(N-1)^{th}$ frame are completed within the time of one frame.

Similarly, as shown in FIGS. 1 and 2, the intermediate timing of the $N^{th}$ frame is the same as the rendering start timing of the image of the $N^{th}$ frame, and the TW processing start timing of the image of the $N^{th}$ frame is the intermediate timing of the $(N+1)^{th}$ frame, that is, the difference between the rendering start timing of the image of the $N^{th}$ frame and the TW processing start timing of the image of the $N^{th}$ frame is 1/fps. In FIG. 5, the receiving timing of the vertical sync signal of the $N^{th}$ frame is the same as the rendering start timing of the image of the $N^{th}$ frame, and the intermediate timing of the $N^{th}$ frame image is the same as the TW processing start timing of the image of the $N^{th}$ frame, so that the difference between the rendering start timing of the image of the $N^{th}$ frame and the TW processing start timing of the image of the $N^{th}$ frame is 0.5/fps. In FIG. 6, considering that in the ATW-based image processing process, the rendering operation and the TW operation occur on different threads so that the receiving timing of the vertical sync signal of the $N^{th}$ frame is the same as the rendering start timing of the image of the $N^{th}$ frame, the TW processing start timing of the image of the $N^{th}$ frame is controlled such that the difference between the rendering start timing of the image of the $N^{th}$ frame and the TW processing start timing of the image of the $N^{th}$ frame is greater than 0.5/fps and less than $$\Delta t_{aim} = \frac{1}{fps} \cdot t2\_average,$$

to ensure that the rendering operation of the image of the $N^{th}$ frame and the TW processing of the image of the $N^{th}$ frame are completed within the time of one frame.

Similarly, in FIGS. 1 and 2, the intermediate timing of the $(N+1)^{th}$ frame is the same as the rendering start timing of the image of the $(N+1)^{th}$ frame, and the TW processing start timing of the image of the $(N+1)^{th}$ frame is the intermediate timing of the $(N+2)^{th}$ frame, that is, the difference between the rendering start timing of the image of the $(N+1)^{th}$ frame and the TW processing start timing of the image of the $(N+1)^{th}$ frame is 1/fps. In FIG. 5, the receiving timing of the vertical sync signal of the $(N+1)^{th}$ frame is the same as the rendering start timing of the image of the $(N+1)^{th}$ frame, and the intermediate timing of the $(N+1)^{th}$ frame image is the same as the TW processing start timing of the image of the $(N+1)^{th}$ frame, so that the difference between the rendering start timing of the image of the $(N+1)^{th}$ frame and the TW processing start timing of the image of the $(N+1)^{th}$ frame is 0.5/fps. In FIG. 6, considering that in the ATW-based image processing process, the rendering operation and the TW operation occur on different threads so that the receiving timing of the vertical sync signal of the $(N+1)^{th}$ frame is the same as the rendering start timing of the image of the $(N+1)^{th}$ frame, the TW processing start timing of the image of the $(N+1)^{th}$ frame is controlled such that the difference between the rendering start timing of the image of the $(N+1)^{th}$ frame and the TW processing start timing of the image of the $(N+1)^{th}$ frame is greater than 0.5/fps and less than $$\Delta t_{aim} = \frac{1}{fps} \cdot t2\_average,$$

to ensure that the rendering operation of the image of the $(N+1)^{th}$ frame and the TW processing of the image of the $(N+1)^{th}$ frame are completed within the time of one frame.

By comparing the analysis results between FIGS. 1 and 5 and those between FIGS. 2 and 6, the sum $t_0$ of the average rendering duration t1_average of the images of the M frames and the average warp processing duration t2_average of the images of the M frames is less than or equal to $$\frac{1}{fps}.$$

By setting the rendering start timing of the image of each frame to be the same as the receiving timing of the corresponding vertical sync signal, and setting the warp processing start timing of the image of each frame, the difference Δt between the rendering start timing of the image of each frame and the warp processing start timing of the image of the corresponding frame can be reduced, thereby effectively shortening the latency time of the TW processing of the image, outputting the images to be displayed rapidly, and reducing the image delay.

At step S530, the warp processing start timing of the image of each frame is set to make the difference Δt between the rendering start timing of the image of each frame and the warp processing start timing of the image of the corresponding frame greater than or equal to the average rendering duration t1_average of the images of the M frames and less than or equal to the preset difference $Δt_{aim}$, which is smaller than Δt_average, where Δt_average is an average value of a plurality of differences, each of which is a difference between the rendering start timing of each of the images of the M frames and the warp processing start timing of a corresponding frame of the images of the M frames.

Figure 7:
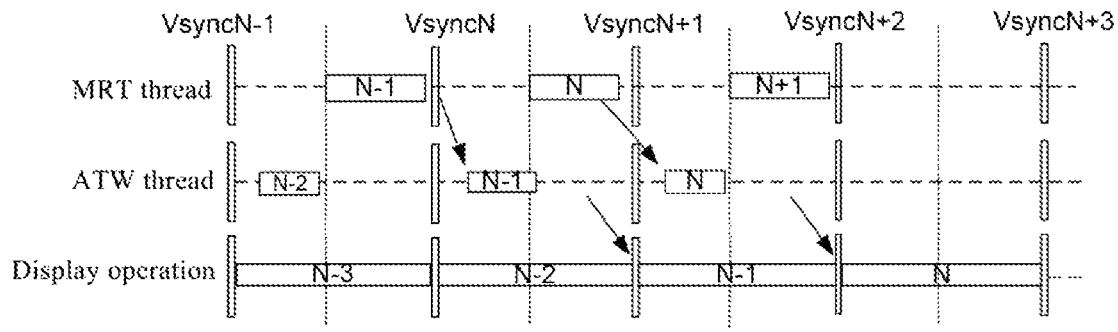
FIG. 7 is a third schematic diagram showing the first ATW-based image processing according to some embodiments of the present disclosure.
Figure 8:
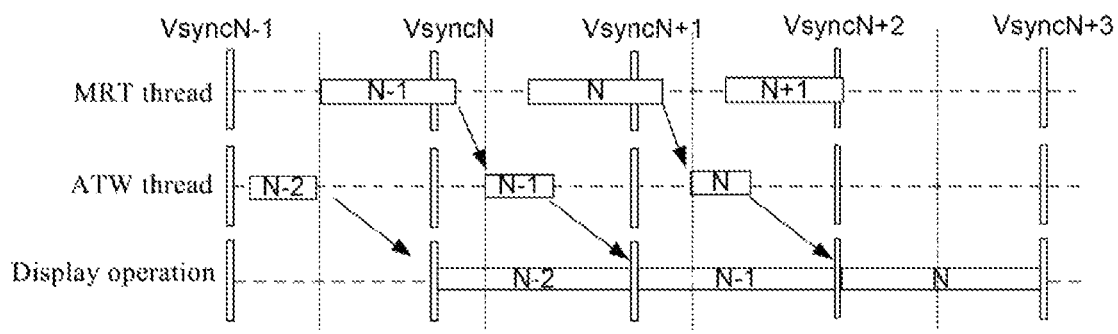
FIG. 8 is a fourth schematic diagram showing the first ATW-based image processing according to some embodiments of the present disclosure.

For example, FIG. 7 shows that the rendering duration of the image of each frame is less than 0.5/fps, and the sum $t_0$ of the average rendering duration t1_average of the images of the M frames and the average warp processing duration t2_average of the images of the M frames is less than or equal to $$\frac{1}{fps},$$

and FIG. 8 shows that the rendering duration of the image of each frame is greater than 0.5/fps and less than $$\frac{1}{fps},$$

and the sum $t_0$ of the average rendering duration t1_average of the images of the M frames and the average warp processing duration t2_average of the images of the M frames is less than or equal to $$\frac{1}{fps}.$$

In FIGS. 7 and 8, considering that in the ATW-based image processing process, the rendering operation and the TW operation occur on different threads, it is possible to make the difference Δt between the rendering start timing of the image of each frame and the TW processing start timing of the image of the corresponding frame less than or equal to $Δt_{aim}$ by only adjusting the start timing of the TW operation in the case of ensuring that the start timing of the rendering operation is unchanged. For example, the rendering start timing of the image of the $(N-2)^{th}$ frame is the same as the intermediate timing of the $(N-2)^{th}$ frame, and only the TW processing start timing of the image of the $(N-2)^{th}$ frame is controlled such that the difference between the rendering start timing of the image of the $(N-2)^{th}$ frame and the TW processing start timing of the image of the $(N-2)^{th}$ frame is greater than the rendering duration of the image of the $(N-2)^{th}$ frame and less than Δt_average which is equal to $$\frac{1}{fps},$$

as shown in FIG. 7 or 8. The rendering start timing of the image of the $(N-1)^{th}$ frame is the same as the intermediate timing of the $(N-1)^{th}$ frame, and only the TW processing start timing of the image of the $(N-1)^{th}$ frame is controlled such that the difference between the rendering start timing of the image of the $(N-1)^{th}$ frame and the TW processing start timing of the image of the $(N-1)^{th}$ frame is greater than the rendering duration of the image of the $(N-1)^{th}$ frame and less than Δt_average which is equal to $$\frac{1}{fps},$$

as shown in FIG. 7 or 8. The rendering start timing of the image of the $N^{th}$ frame image is the same as the intermediate timing of the $N^{th}$ frame, and only the TW processing start timing of the image of the $N^{th}$ frame is controlled such that the difference between the rendering start timing of the image of the $N^{th}$ frame and the TW processing start timing of the image of the $N^{th}$ frame is greater than the rendering duration of the image of the $N^{th}$ frame and less than Δt_average which is equal to $$\frac{1}{fps},$$

as shown in FIG. 7 or 8. The rendering start timing of the image of the $(N+1)^{th}$ frame is the same as the intermediate timing of the $(N+1)^{th}$ frame, and only the TW processing start timing of the image of the $(N+1)^{th}$ frame is controlled such that the difference between the rendering start timing of the image of the $(N+1)^{th}$ frame and the TW processing start timing of the image of the $(N+1)^{th}$ frame is greater than the rendering duration of the image of the $(N+1)^{th}$ frame and less than Δt_average which is equal to $$\frac{1}{fps},$$

as shown in FIG. 7 or 8.

By comparing analysis results between FIGS. 1 and 7 and those between FIGS. 2 and 8, it can be found that when the sum $t_0$ of the average rendering duration t1_average of the images of the M frames and the average warp processing duration t2_average of the images of the M frames is less than or equal to $$\frac{1}{fps},$$

it is possible to make the difference Δt between the rendering start timing of the image of each frame and the TW processing start timing of the image of the corresponding frame less than or equal to the preset difference Δt_average by only controlling the warp processing start timings of the images. However, in the case shown in FIG. 7 or 8, the rendering operation and the TW operation of the image of each frame cannot be completed within one frame, and can only be completed in two frames.

It should be noted that if the sum $t_0$ of the average rendering duration t1_average of the images of the M frames and the average warp processing duration t2_average of the images of the M frames is less than $$\frac{0.5}{fps},$$

it is still possible to make rendering operation and TW operation of the image of each frame completed in one frame by controlling the TW processing start timing of the image of each frame.

At step S240, the rendering start timing of the image of each frame is set to be the same as the receiving timing of the corresponding vertical sync signal, and the warp processing start timing of the image of each frame is set to make the difference Δt between the rendering start timing of the image of each frame and the TW processing start timing of the image of the corresponding frame greater than or equal to the average rendering duration t1_average of the images of the M frames and less than or equal to the preset difference $Δt_{aim}$ where $Δt_{aim} < Δt\_average$.

Figure 9:
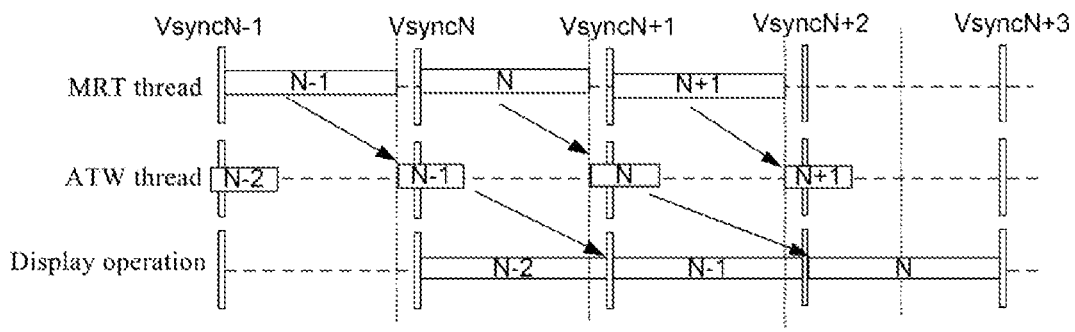
FIG. 9 is a fifth schematic diagram showing the first ATW-based image processing according to some embodiments of the present disclosure.

FIGS. 3 and 9 show that the rendering duration of the image of each frame shown in is greater than 0.5/fps, and the sum $t_0$ of the average rendering duration t1_average of the images of the M frames and the average warp processing duration t2_average of the images of the M frames is greater than $$\frac{1}{fps}.$$

In FIG. 3, the intermediate timing of the (N−2)$^{th}$ frame is the same as the rendering start timing of the image of the (N−2)$^{th}$ frame, and the TW processing start timing of the image of the (N−2)$^{th}$ frame is the intermediate timing of the (N−1)$^{th}$ frame as shown in FIG. 3, that is, the difference between the rendering start timing of the image of the (N−2)$^{th}$ frame and the TW processing start timing of the image of the (N−2)$^{th}$ frame is 1/fps. In FIG. 9, considering that in the ATW-based image processing process, the rendering operation and the TW operation occur on different threads, it is possible, in the case of controlling the rendering start timing of the image of each frame to be the same as the receiving timing of the vertical sync signal of the corresponding frame, to control the TW processing start timing of the image of each frame such that the difference between the rendering start timing and the TW operation start timing of the image of each frame is greater than or equal to the average rendering duration t1_average and less than or equal to the present difference $Δt_{aim}$, where $$Δt_{aim} < Δt\_average = \frac{1}{fps}.$$

In this way, the latency time of the TW operation can be reduced. For example, the rendering start timing of the image of the (N−2)$^{th}$ frame is the same as the receiving timing of the vertical sync signal of the (N−2)$^{th}$ frame, and the TW processing start timing of the image of the (N−2)$^{th}$ frame is shown in FIG. 9, so that the difference between the rendering start timing of the image of the (N−2)$^{th}$ frame and the TW processing start timing of the image of the (N−2)$^{th}$ frame is greater than the rendering duration of the image of the (N−2)$^{th}$ frame and less than $$Δt\_average = \frac{1}{fps}.$$

The rendering start timing of the image of the (N−1)$^{th}$ frame is the same as the intermediate timing of the (N−1)$^{th}$ frame, and the TW processing start timing of the image of the (N−1)$^{th}$ frame is shown in FIG. 9, so that the difference between the rendering start timing of the image of the (N−1)$^{th}$ frame and the TW processing start timing of the image of the (N−1)$^{th}$ frame is greater than the rendering duration of the image of the (N−1)$^{th}$ frame and less than $$Δt\_average = \frac{1}{fps}.$$

The rendering start timing of the image of the N$^{th}$ frame is the same as the intermediate timing of the N$^{th}$ frame, and the TW processing start timing of the image of the N$^{th}$ frame is shown in FIG. 9, so that the difference between the rendering start timing of the image of the N$^{th}$ frame and the TW processing start timing of the image of the N$^{th}$ frame is greater than the rendering duration of the image of the N$^{th}$ frame and less than $$Δt\_average = \frac{1}{fps}.$$

The rendering start timing of the image of the (N+1)$^{th}$ frame is the same as the intermediate timing of the (N+1)$^{th}$ frame, and the TW processing start timing of the image of the (N+1)$^{th}$ frame is shown in FIG. 9, so that the difference between the rendering start timing of the image of the (N+1)$^{th}$ frame and the TW processing start timing of the image of the (N+1)$^{th}$ frame is greater than the rendering duration of the image of the (N+1)$^{th}$ frame and less than $$Δt\_average = \frac{1}{fps}.$$

By comparing the analysis results between FIGS. 3 and 9, it can be seen that when the sum $t_0$ of the average rendering duration t1_average of the images of the M frames and the average warp processing duration t2_average of the images of the M frames is greater than $$\frac{1}{fps},$$

it is possible to control the rendering start timing of the image of each frame and the warp processing start timing of the image of each frame to reduce the latency time of the TW operation of the image of each frame.

Further, when the rendering operation of the image of each frame and the TW operation of the image of the corresponding frame are completed in one frame, it can be ensured that the image of the current frame having been subjected to the TW operation is displayed in a subsequent frame display operation, thereby reducing the image delay. That is, if the rendering operation and the TW operation of the image of the $N^{th}$ frame are completed between the receiving timing of the vertical sync signal of the $N^{th}$ frame and the receiving timing of the vertical sync signal of the $(N+1)^{th}$ frame, the $N^{th}$ frame image which has been subjected to TW processing can be displayed in the display operation of the $(N+1)^{th}$ frame to reduce the image delay.

By comparing FIGS. 1, 5 and 6, it can be found that the rendering operation and the TW operation of the image of each frame shown in FIG. 1 are completed in two frames, and those shown in FIGS. 5 and 6 are completed in one frame, so that images are outputted earlier in the cases of FIGS. 5 and 6, thereby reducing the image delay.

By comparing FIGS. 1 and 7 to 9, it can be found that the rendering operation and the TW operation of the image of each frame shown in these figures are completed within two frames, so that the times at which the images are outputted in FIGS. 7 to 9 are not changed.

In some embodiments, as shown in FIG. 12, the setting the system frame rate to make the rendering duration of the image of each frame match the motion gesture requirement includes step S610 of setting the system frame rate to be equal to the average rendering duration t1_average of the images of the M frames to make the warp processing start timing of the image of each frame the same as a rendering end timing of the image of a corresponding frame. This is equivalent to reducing the receiving frequency of the vertical sync signal in the subsequent image processing process, so that the difference between the receiving timings of the vertical synchronizing signals of the two adjacent frames is equal to the average rendering duration t1_average of the images of the M frames. In this way, at the end of the rendering operation of the image of the current frame, the TW operation of the image of the current frame can be started immediately, which not only can shorten the latency time of the TW operation of the image of the current frame, but can also make image contents displayed by the display in two consecutive frames different, thereby reducing the image delay and avoiding the image jitter problem.

Figure 10:
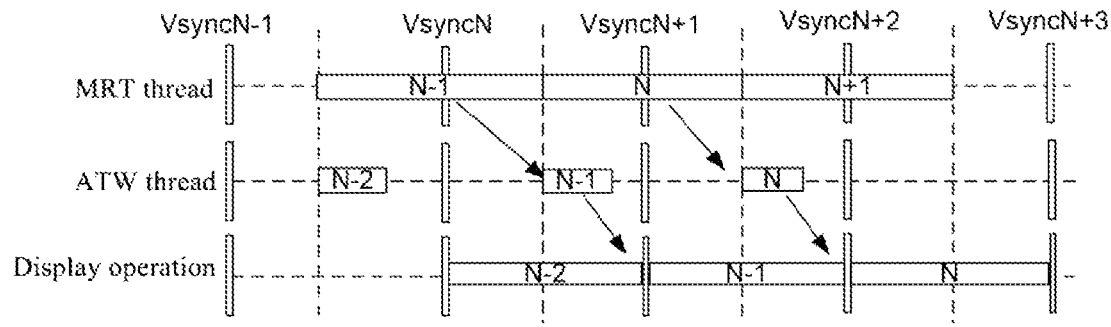
FIG. 10 is a schematic diagram showing second ATW-based image processing according to some embodiments of the present disclosure.

Illustratively, FIG. 4 shows a schematic diagram of second ATW-based image processing in the related art, while FIG. 10 shows a schematic diagram of second ATW-based image processing in an embodiment of the present disclosure.

As shown in FIGS. 4 and 10, prior to the intermediate timing of the $(N-1)^{th}$ frame, the rendering of the image of the $(N-2)^{th}$ frame has been completed. Therefore, the TW processing of the image of the $(N-2)^{th}$ frame can be started at the intermediate timing of the $(N-1)^{th}$ frame, so that the display displays an image content of the $(N-2)^{th}$ frame in the $N^{th}$ frame. As shown in FIG. 4, the intermediate timing of the $(N-1)^{th}$ frame is the same as the rendering start timing of the image of the $(N-1)^{th}$ frame, and the rendering end timing of the image of the $(N-1)^{th}$ frame has exceeded the intermediate timing of the $N^{th}$ frame, so that the rendering duration of the image of the $(N-1)^{th}$ frame is greater than 1/fps. Therefore, at the intermediate timing of the $N^{th}$ frame image, the TW processing of the image of the $(N-1)^{th}$ frame cannot be started, and only the TW processing of the image of the $(N-2)^{th}$ frame that has been rendered can be started. That is, the difference between the rendering start timing of the image of the $N^{th}$ frame and the warp processing start timing of the image of the $N^{th}$ frame is 2/fps. At this time, the display device displays the image content of the $(N-2)^{th}$ frame in the $(N+1)^{th}$ frame. As shown in FIG. 10, by setting the system frame rate to be equal to the average rendering duration t1_average of the images of the M frames to make the intermediate timing of the $(N-1)^{th}$ frame the same as the rendering start timing of the image of the $(N-1)^{th}$ frame, and the rendering end timing of the image of the $(N-1)^{th}$ frame the same as the intermediate timing of the $N^{th}$ frame, the rendering duration of the image of the $(N-1)^{th}$ frame is equal to 1/fps, and the difference between the rendering start timing of the image of the $(N-1)^{th}$ frame and the TW processing start timing of the image of the $(N-1)^{th}$ frame is equal to 1/fps. That is, the TW processing of the image of the $(N-1)^{th}$ frame can be started at the intermediate timing of the $N^{th}$ frame, thereby ensuring that the display device displays the image content of the $(N-2)^{th}$ frame in the $(N-1)^{th}$ frame. Thus, when the rendering duration of the image of the $(N-1)^{th}$ frame is greater than 1/fps, the image displayed by the display device will have the image delay and jitter problems. Accordingly, when the rendering duration of the image of the $(N-1)^{th}$ frame is equal to 1/fps, the latency time of the image warp processing of the $(N-1)^{th}$ frame can also be reduced, thereby effectively improving the utilization efficiency of the graphics processor.

Similarly, as shown in FIG. 4, the rendering end timing of the image of the $(N-1)^{th}$ frame has exceeded the intermediate timing of the $N^{th}$ frame, so that the rendering start timing of the image of the $N^{th}$ frame can only be the same as the intermediate timing of the $(N+1)^{th}$ frame. Prior to the intermediate timing of the $N^{th}$ frame, the rendering of the image of $(N-1)^{th}$ frame has been completed, which enables the TW processing of the image of the $(N-1)^{th}$ frame to be started at the intermediate timing of the $(N+1)^{th}$ frame so as to ensure that the image content of the $(N-1)^{th}$ frame is displayed by the display device in the $(N+2)^{th}$ frame. As can be thus seen, when the rendering duration of the image of the $(N-1)^{th}$ frame is greater than 1/fps in the related art, not only the image jitter problem easily occurs, but the latency times of the image rendering and of image TW processing are also long. As shown in FIG. 10, after the frame rate has been adjusted, the rendering of the image of the $(N-1)^{th}$ frame has been completed at the intermediate timing of the $N^{th}$ frame. Therefore, the rendering of the image of the $N^{th}$ frame and the TW processing of the image of the $(N-1)^{th}$ frame can be simultaneously started at the intermediate timing of the $N^{th}$ frame to allow the display device to display the image content of the $(N-1)^{th}$ frame in the $(N+1)^{th}$ frame. Moreover, at the intermediate timing of the $(N+1)^{th}$ frame, the rendering of the image of the $N^{th}$ frame has been completed. Therefore, the rendering of the image of the $(N+1)^{th}$ frame and the TW processing of the image of the $N^{th}$ frame can be simultaneously started at the intermediate timing of the $(N+1)^{th}$ frame to allow the display device to display the image content of the $N^{th}$ frame in the $(N+2)^{th}$ frame.

By comparing the analysis results between FIGS. 4 and 10, it can be found that by setting the frame rate, not only the latency times of the image rendering and of the image TW processing can be effectively reduced, but the image delay and jitter problems can also be reduced to improve the utilization efficiency of the graphics processor in the case of ensuring the normal display of the images.

Specifically, an existing frame debugging formula is:

$$FPS = \frac{Mipispeed * DSC \text{ compression parameter} * lane\_num)}{[(width + hsync + hfp + hbp) * \\ (height + vsync + vfp + vbp)] * (bus\_width)}$$

where the DSC compression parameter, lane_num, bus_width, width, and height are all fixed values, and the size of the FPS is ultimately determined by the other parameters. That is, as long as hsync, hfp, hbp, vsync, vfp, and vbp are determined, the system frame rate can be determined. Therefore, hsync, hfp, hbp, vsync, vfp, and vbp are defined as BSP display drive parameters.

Among them, Mipispeed represents a transmission rate of each lane.

DSC compression parameter indicates that the processor performs data compression using the DSC protocol in order to reduce the transmission of the total amount of data. Moreover, the larger the degree of compression is, the less data is transmitted, and the standard adopts ⅓ compression.

Lane_num represents the number of lanes.

Bus_width represents a bus_width or video memory bit width.

Width represents a width of an effective display image.

Height represents a length of an effective display area.

Hsync represents a frequency of a horizontal sync signal.

Hfp represents the number of VCLKs between the end of a line of valid data and the start of a next horizontal sync signal, where VCLK refers to a clock signal vollabele.

Hbp is an abbreviation for horizontal back porch, and represents the number of VCLKs from the start of the horizontal sync signal to the start of a line of valid data, where VCLK refers to the clock signal vollabele.

Vsync represents a frequency of the vertical sync signal.

Vfp is an abbreviation for vertical front porch, and represents the number of invalid lines between the start of a vertical sync signal of a frame and the end of an image of an immediately preceding frame.

Vbp is an abbreviation for vertical back porch, and represents the number of invalid lines between the end of the vertical sync signal and the start of an image of an immediately subsequent frame.

Figure 14:
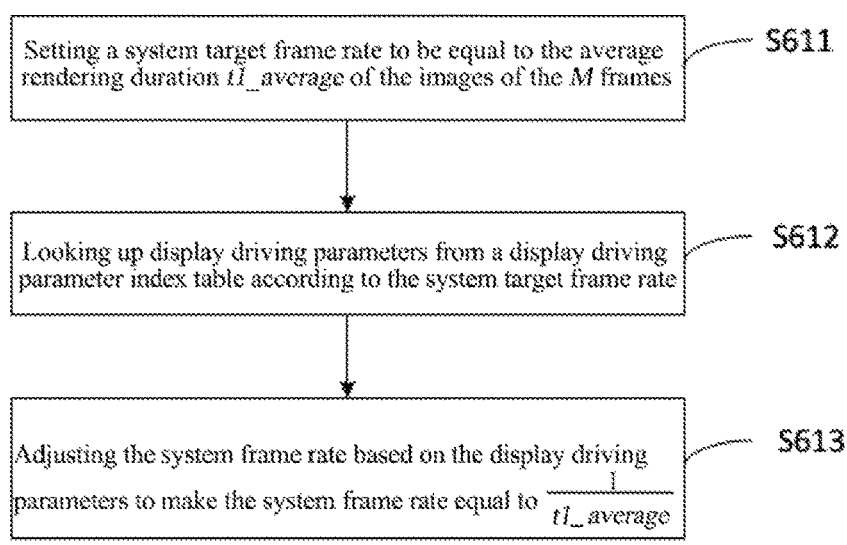
FIG. 14 is a fourth flowchart showing an image processing method according to some embodiments of the present disclosure.

As shown in FIG. 14, the above-mentioned setting the system frame rate to be equal to the average rendering duration t1_average of the images of the M frames includes:

Step S611: setting a system target frame rate to be equal to the average rendering duration t1_average of the images of the M frames;

Step S612: looking up display driving parameters from a display driving parameter index table according to the system target frame rate; the display driving parameter index table here refers to a display driving parameter index table which is established with the system frame rate as a primary key for different system frame rates in the function development table, and for example, when the primary key is of 90 fps, the table corresponds to a group of Mipispeed, hsync, hfp, hbp, vsync, vfp, and vbp; and Step S613: adjusting the system frame rate based on the display driving parameters to make the system frame rate equal to $$\frac{1}{t1\_average}.$$

Figure 11:
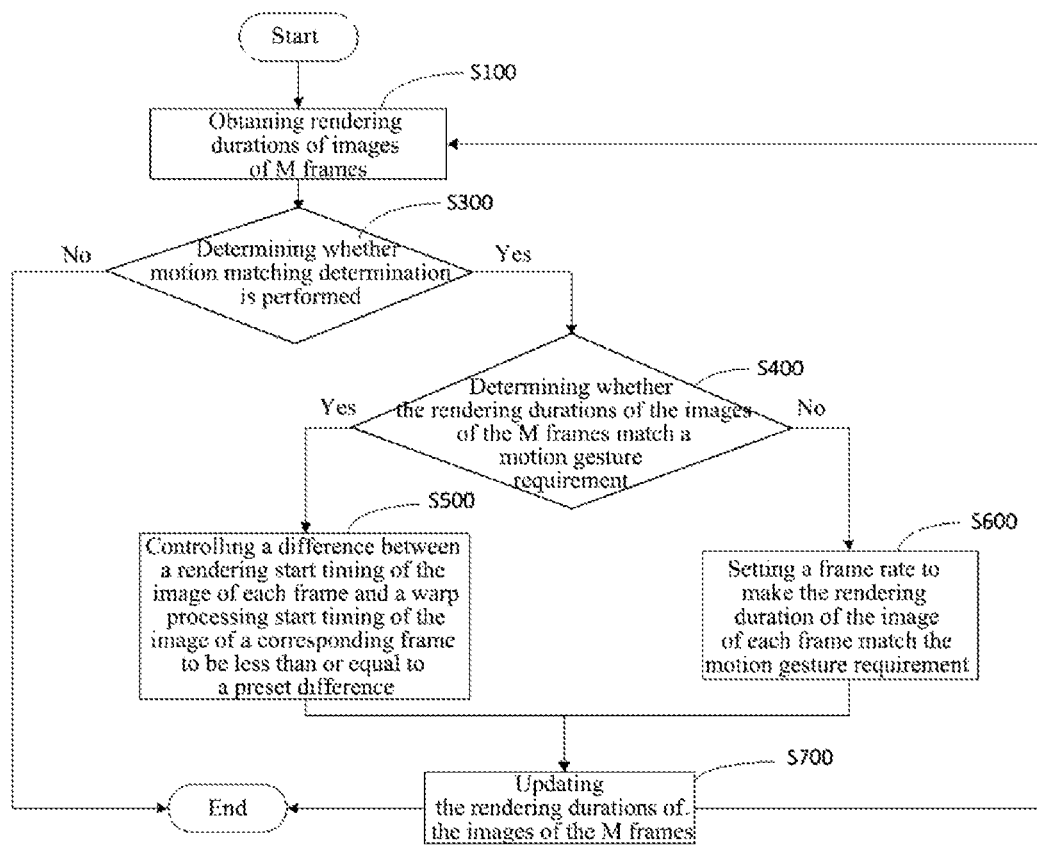
FIG. 11 is a first flowchart showing an image processing method according to some embodiments of the present disclosure.

In some embodiments, considering the user experience, the system frame rate of the VR display device needs to be greater than 60 Hz, and some even above 90 Hz or 120 Hz, and when the system frame rate is greater than or equal to 90 Hz or 120 Hz, the image rendering of a complicated image scene can be satisfied and it can be basically guaranteed that the user has no head vertigo problem in use. Based on this, as shown in FIG. 11, after acquiring the average rendering duration t1_average of the images of the M frames and before determining whether the rendering durations of the images of the M frames match the motion gesture requirement, the image processing method further includes step S300 of determining whether motion matching determination is performed. A specific method is shown in FIG. 12 and includes the following steps.

At step S310, it is determined whether the average rendering duration t1_average of the images of the M frames is less than or equal to 1/K, where K is a system frame rate threshold, which is an integer greater than or equal to 90 Hz. Of course, it can also be set according to actual conditions, and for example, K can be determined to be equal to 90 according to a user experience report.

If yes, step S400 is performed. Otherwise, the process ends.

It can be understood that the above image processing method further includes:

Step S100': obtaining warp processing durations of the images of the M frames; and Step S200: acquiring an average rendering duration t1_average of the images of the M frames from the rendering durations of the images of the M frames to obtain a distribution of the rendering duration of the image of each frame, and acquiring an average warp processing duration t2_average of the images of the M frames from the warp processing durations of the images of the M frames to obtain a distribution of the warp processing duration of the image of each frame. At the same time, an average value Δt_average is average value of a plurality of differences, each of which is a difference between the rendering start timing of each of the images of the M frames and the warp processing start timing of a corresponding frame of the images of the M frames.

The warp processing durations of the images of the M frames are obtained so long as the difference Δt between the rendering start timing of the image of each frame and the warp processing start timing of the image of the corresponding frame is less than or equal to the preset difference $\Delta t_{aim}$, but it can be anticipated that the warp processing durations of the images of the M frames can be obtained along with the obtaining of the rendering durations of the images of the M frames. Therefore, as shown in FIG. 13, the operation of obtaining the warp processing durations of the images of the M frames and the operation of obtaining the rendering durations of the images of the M frames are performed simultaneously. Meanwhile, in the process of obtaining the rendering durations and the warp processing durations of the images of the M frames, the rendering start timings and the warp processing start timings of the images of the M frames can also be obtained for calculating the average difference Δt_average between the rendering start timings of the images of the M frames and the warp processing start timings of the images of the M frames. In addition, as shown in FIGS. 12 and 13, the above step S200 is optionally performed before steps S500 and S600, so as to control the difference Δt between the rendering start timing of the image of each frame and the warp processing start timing of the image of the corresponding frame to be less than or equal to the preset difference $\Delta t_{aim}$, or to set the system frame rate. In order to facilitate the execution of the process, for example, the above step S200 can be arranged between step S100 and step S300, as shown in FIG. 12.

There are various specific manners for counting the above-mentioned rendering durations of the images of the M frames, which will be illustrated below.

Figure 15:
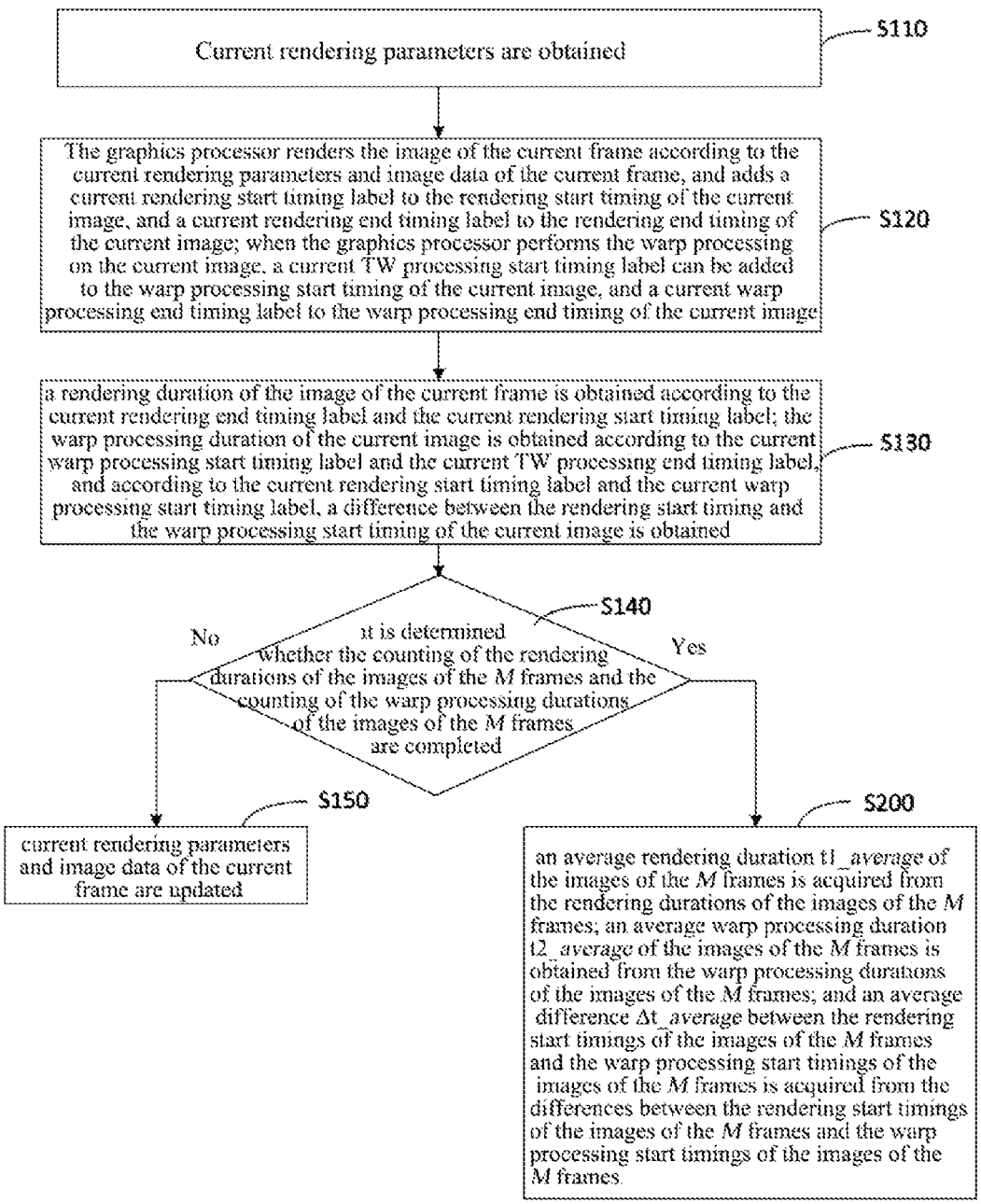
FIG. 15 is a fifth flowchart showing an image processing method according to some embodiments of the present disclosure.

As shown in FIG. 15, the obtaining the rendering durations of the images of the M frames includes the following steps.

At step S110, current rendering parameters are obtained, including rendering resolution, angle of view, and user gesture information, but being not limited thereto.

At step S120, the graphics processor renders the image of the current frame according to the current rendering parameters and image data of the current frame, and adds a current rendering start timing label to the rendering start timing of the current image, and a current rendering end timing label to the rendering end timing of the current image. At the same time, in this process, when the graphics processor performs the warp processing on the current image, a current TW processing start timing label can be added to the warp processing start timing of the current image, and a current warp processing end timing label to the warp processing end timing of the current image.

At step S130, a rendering duration of the image of the current frame is obtained according to the current rendering end timing label and the current rendering start timing label. Of course, the warp processing duration of the current image can also be obtained according to the current warp processing start timing label and the current TW processing end timing label. At the same time, according to the current rendering start timing label and the current warp processing start timing label, a difference between the rendering start timing and the warp processing start timing of the current image can be further obtained, that is, the obtaining of the difference between the rendering start timing of an image of one frame and the warp processing start timing of the image of the corresponding frame is completed.

At step S140, it is determined whether the obtaining of the rendering durations of the images of the M frames and the counting of the warp processing durations of the images of the M frames are completed.

If yes, step S150 is performed; otherwise, step S200 is performed.

At step S150, current rendering parameters and image data of the current frame are updated.

To determine the distribution of the rendering durations of the images.

In some embodiments, as shown in FIGS. 11 and 12, considering the complexity and variety of changes of the video scene, it is desirable to cyclically process the images using the image processing method as described above. Based on this, after the difference between the rendering start timing of the image of each frame and the warp processing start timing of the image of the corresponding frame is reduced, or after the rendering duration of the image of each frame matches the motion gesture requirement, the image processing method further includes step S700 of updating the rendering durations of the images of the M frames, that is, re-obtaining the rendering durations of the images of the M frames, to re-determine whether the rendering durations of the images of the M frames match the motion gesture requirement, so that the image processing process is performed dynamically so as to avoid an error caused by the long-term use of the same group of the obtained rendering durations of the images of the M frames.

As shown in FIGS. 5 to 11 and 16, an image processing apparatus according to some embodiments of the present disclosure includes: a duration obtaining circuit 100, configured to obtain rendering durations of images of M frames; a match determining circuit 300, connected to the duration obtaining circuit 100 and configured to determine whether the rendering durations of the images of the M frames match a motion gesture requirement; a first modulating circuit 600, connected to the match determining circuit 300 and configured to control a difference $\Delta t$ between a rendering start timing of the image of each frame and a warp processing start timing of the image of a corresponding frame to be less than or equal to a preset difference $\Delta t_{aim}$ when the rendering durations of the images of the M frames match the motion gesture requirement; and a second modulating circuit 700, connected to the match determining circuit 300 and configured to set a system frame rate to make the rendering duration of the image of each frame match the motion gesture requirement.

As compared with the related art, the image processing apparatus provided by the embodiments of the present disclosure produces beneficial effects which are the same as or similar to those of the image processing method described above, and which will not be described herein.

Figure 16:
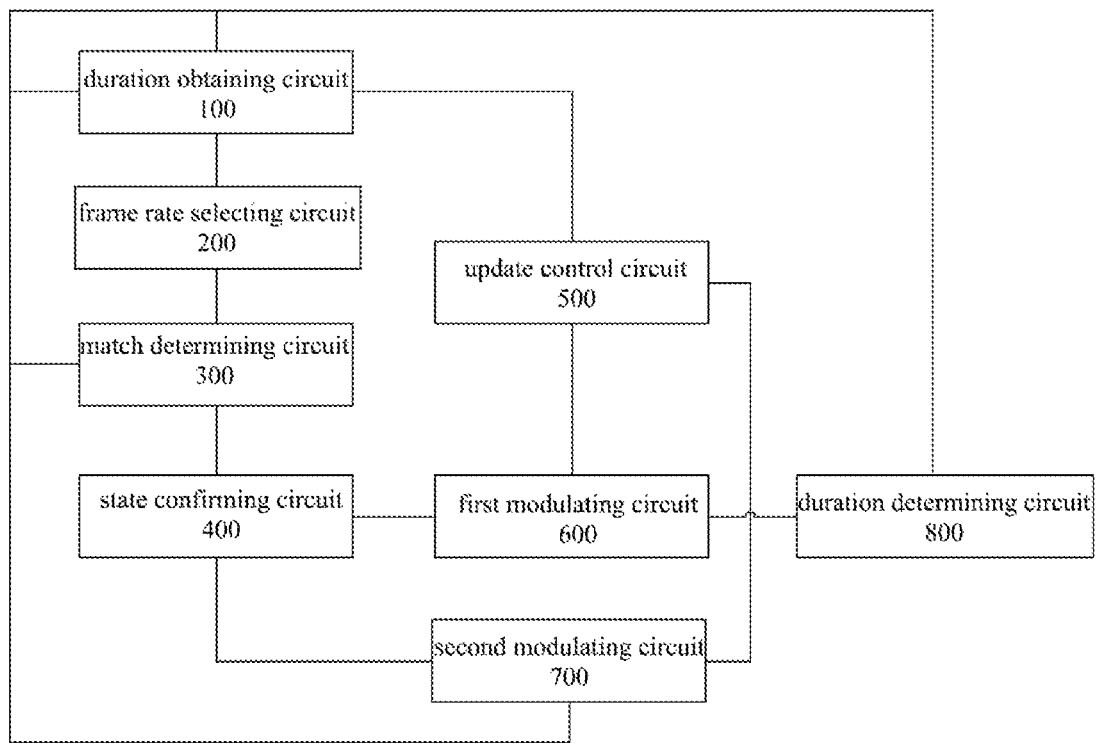
FIG. 16 is a block diagram showing a system circuit architecture of an image processing apparatus according to some embodiments of the present disclosure.

In some embodiments, as shown in FIG. 12 and FIG. 16, the match determining circuit 300 is further configured to determine whether the rendering durations of n % or more of the images of the M frames are less than or equal to $$\frac{1}{fps},$$

where fps is the system frame rate, and n is an integer greater than or equal to 50.

The image processing apparatus further includes a state confirming circuit 400, connected to the match determining circuit 300, the first modulating circuit 600 and the second modulating circuit 700 and configured to confirm that the rendering durations of the images of the M frames match the motion gesture requirement if the rendering durations of n % or more of the images of the M frames are less than or equal to $$\frac{1}{fps},$$

and to confirm that the rendering durations of the images of the M frames do not match the motion gesture requirement if the rendering durations of n % or more of the images of the M frames is greater than $$\frac{1}{fps}.$$

In some embodiments, as shown in FIG. 13 and FIG. 16, the duration obtaining circuit 100 is further configured to, prior to controlling the difference $\Delta t$ between the rendering start timing of the image of each frame and the warp processing start timing of the image of the corresponding frame to be less than or equal to the preset difference $\Delta t_{aim}$, obtain warp processing durations of the images of the M frames, acquire an average rendering duration t1_average of the images of the M frames from the rendering durations of the images of the M frames, and acquire an average warp processing duration t2_average of the images of the M frames from the warp processing durations of the images of the M frames.

The first modulating circuit 600 is further configured to:

if a sum $t_0$ of the average rendering duration t1_average of the images of the M frames and the average warp processing duration t2_average of the images of the M frames is less than or equal to $$\frac{1}{fps},$$

where fps is the system frame rate, set the rendering start timing of the image of each frame to be the same as a receiving timing of a corresponding vertical sync signal, and set the warp processing start timing of the image of each frame to make the difference $\Delta t$ between the rendering start timing of the image of each frame and the warp processing start timing of the image of the corresponding frame greater than or equal to the average rendering duration t1_average of the images of the M frames and less than or equal to the preset difference $\Delta t_{aim}$, where $$\Delta t_{aim} = \frac{1}{fps} - t2\_average;$$

or set the warp processing start timing of the image of each frame to make the difference $\Delta t$ between the rendering start timing of the image of each frame and the warp processing start timing of the image of the corresponding frame greater than or equal to the average rendering duration t1_average of the images of the M frames and less than or equal to the preset difference $\Delta t_{aim}$, where $\Delta t_{aim}$ is smaller than $\Delta t\_average$, where $\Delta t\_average$ is an average value of a plurality of differences, each of which is a difference between the rendering start timing of each of the images of the M frames and the warp processing start timing of a corresponding frame of the images of the M frames; and if the sum $t_0$ of the average rendering duration t1_average of the images of the M frames and the average warp processing duration t2_average of the images of the M frames is greater than $$\frac{1}{fps},$$

set the rendering start timing of the image of each frame to be the same as the receiving timing of the corresponding vertical sync signal, and set the warp processing start timing of the image of each frame to make the difference $\Delta t$ between the rendering start timing of the image of each frame and the warp processing start timing of the image of the corresponding frame greater than or equal to the average rendering duration t1_average of the images of the M frames and less than or equal to the preset difference $\Delta t_{aim}$, which is smaller than $\Delta t\_average$, where $\Delta t\_average$ is an average value of a plurality of differences, each of which is a difference between the rendering start timing of each of the images of the M frames and the warp processing start timing of a corresponding frame of the images of the M frames.

It can be understood that, as shown in FIG. 13 and FIG. 16, the image processing apparatus further includes a duration determining circuit 800, connected to the first modulating circuit 600 and the duration obtaining circuit 100, and configured to determine whether the sum $t_0$ of the average rendering duration t1_average of the images of the M frames and the average warp processing duration t2_average of the images of the M frames is less than or equal to $$\frac{1}{fps}.$$

In some embodiments, as shown in FIG. 12 and FIG. 16, the duration obtaining circuit 100 is further configured to acquire an average rendering duration t1_average of the images of the M frames from the rendering durations of the images of the M frames, subsequent to obtaining the rendering durations of the images of the M frames and prior to determining whether the rendering durations of the images of the M frames match the motion gesture requirement.

As shown in FIG. 12 and FIG. 16, the second modulating circuit 700 is further connected to the duration obtaining circuit 100. The second modulating circuit 700 is further configured to set the system frame rate to be equal to the average rendering duration t1_average of the images of the M frames to make the warp processing start timing of the image of each frame the same as a rendering end timing of the image of a corresponding frame.

Illustratively, as shown in FIG. 14 and FIG. 16, the second modulating circuit 700 is further configured to set a system target frame rate to be equal to the average rendering duration t1_average of the images of the M frames, look up display driving parameters from a display driving parameter index table according to the system target frame rate, and adjust the system frame rate based on the display driving parameters to make the system frame rate equal to $$\frac{1}{t1\_average}.$$

Illustratively, as shown in FIG. 12 and FIG. 16, the image processing apparatus further includes: a frame rate selecting circuit 200, connected to the duration obtaining circuit 100 and the match determining circuit 300 and configured to determine whether the average rendering duration t1_average of the images of the M frames is less than 1/K, where K is a system frame rate threshold.

The match determining circuit 300 is further configured to determine whether the rendering durations of the images of the M frames match the motion gesture requirement if the system frame rate is less than or equal to K.

In some embodiments, as shown in FIGS. 11, 12 and 16, the image processing apparatus further includes an update control circuit 500, connected to the first modulating circuit 600, the second modulating circuit 700 and the duration obtaining circuit 100, and configured to control the updating of the rendering durations of the images of the M frames so that they are updated, after the difference between the rendering start timing of the image of each frame and the warp processing start timing of the image of the corresponding frame is reduced, or after the rendering duration of the image of each frame matches the motion gesture requirement.

Embodiments of the present disclosure further provide a display device including the image processing apparatus as described above.

As compared with the related art, the display device provided by the embodiment of the present disclosure produces beneficial effects which are the same as or similar to those of the image processing apparatus described above, and which will not be described herein.

The display device provided by the foregoing embodiment can be any product or component having a display function, such as a mobile phone, a tablet computer, a television, a display, a notebook computer, a digital photo frame, or a navigator. These display devices can be ordinary display devices, or mobile display devices such as mobile phones, tablets, wearable display devices, and the like.

Embodiments of the present disclosure further provide a computer storage medium for storing one or more computer software instructions including programs designed to execute the image processing method as described above.

As compared with the related art, the computer storage medium provided by the embodiment of the present disclosure produces beneficial effects which are the same as or similar to those of the image processing apparatus described above, and which will not be described herein.

A person skilled in the art can understand that all or part of the flow of implementing the method of the above embodiments can be completed by using a computer program to instruct related hardware, which program can be stored in the above computer storage medium. When the program is executed, the flows of the embodiments of the methods as described above can be carried out. The computer storage medium can be a magnetic disk, an optical disk, a read-only memory (ROM), a random access memory (RAM), or the like.

Figure 17:
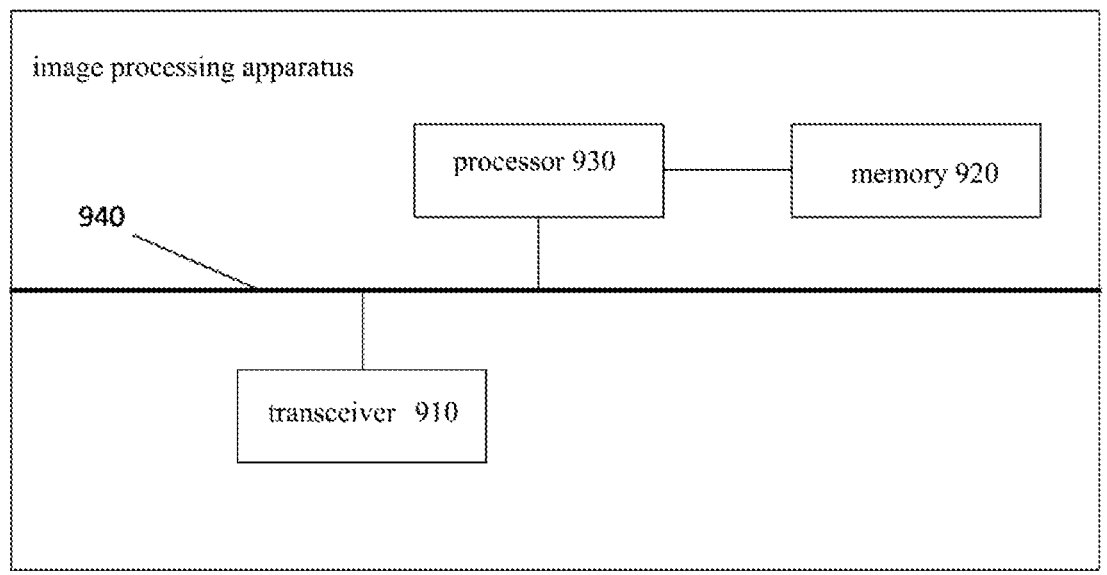
FIG. 17 is a hardware architecture diagram of an image processing terminal according to some embodiments of the present disclosure.

As shown in FIG. 17, an embodiment of the present disclosure further provides an image processing apparatus including at least a memory 920 and a processor 930. The memory 920 is configured to store one or more computer software instructions including a program designed to execute the image processing method as described above. The processor 930 is configured to execute the image processing method described above in accordance with the one or more computer software instructions.

Of course, as shown in FIG. 17, the above image processing apparatus can further include a transceiver 910 for receiving various kinds of information and a bus 940. The transceiver 910, memory 920, and processor 930 communicate with one another via the bus 940.

The processor 930 in the embodiment of the present disclosure may be one single processor or a collective name of multiple processing elements. For example, the processor 930 can be a central processing unit (CPU), or an application specific integrated circuit (ASIC), or one or more integrated circuits configured to implement the embodiments of the present disclosure, such as one or more digital signal processors (DSPs), or one or more Field Programmable Gate Arrays (FPGAs).

The memory 920 can be a storage device or a collective name of a plurality of storage elements, and configured to store executable program codes or the like. Moreover, the memory can include a random access memory (RAM), or a non-volatile memory such as a magnetic disk memory, a flash memory, or the like.

The bus 940 can be an industry standard architecture (ISA) bus, a peripheral component (PCI) bus, an extended industry standard architecture (EISA) bus, or the like. The bus 940 can be divided into an address bus, a data bus, a control bus, and the like. For ease of illustration, only one thick line is shown in FIG. 17, but it does not mean that there is only one bus or one type of bus.

The various embodiments in the specification are described in a progressive manner, and the same or similar parts between the various embodiments may be referred to each other, and each embodiment focuses on the differences from the other embodiments. In particular, for the device embodiment, since it is basically similar to the method embodiment, the description is relatively simple, and reference can be made to the description of the method embodiment for the relevant parts.

The above are only the specific embodiments of the present disclosure, but the scope of the present disclosure is not limited thereto, and any person skilled in the art can easily think of changes or substitutions within the technical scope of the disclosure, and such changes and substitutions should fall within the protection scope of the present disclosure. Therefore, the scope of protection of the present disclosure should be defined by the claims.

What is claimed is:

1. An image processing method, comprising:
   obtaining rendering durations of images of M frames to be processed;
   determining whether the rendering durations of the images of the M frames to be processed match a motion gesture requirement, wherein the motion gesture requirement represents that, in response to a user changing his/her head gesture, Virtual Reality (VR) image seen by the user will not jitter, wherein the VR image has been subject to the rendering process on the M frames to be processed;
   controlling a difference $\Delta t$ between a rendering start timing of the image of each frame and a warp processing start timing of the image of a corresponding frame to be less than or equal to a preset difference $\Delta t_{aim}$, in response to determining the rendering durations of the images of the M frames to be processed match the motion gesture requirement; and
   setting a system frame rate used for a rendering duration of each frame of the picture to be processed, to make the rendering duration of the image of each frame of the picture to be processed match the motion gesture requirement, in response to determining the rendering durations of the images of the M frames to be processed do not match the motion gesture requirement,
   wherein prior to the controlling the difference $\Delta t$ between the rendering start timing of the image of each frame and the warp processing start timing of the image of the corresponding frame to be less than or equal to the preset difference $\Delta t_{aim}$, the image processing method further comprises:
   acquiring an average rendering duration t1_average of the images of the M frames to be processed from the rendering durations of the images of the M frames to be processed;
   obtaining warp processing durations of the images of the M frames to be processed, and acquiring an average warp processing duration t2_average of the images of the M frames to be processed from the warp processing durations of the images of the M frames to be processed;
   the controlling the difference $\Delta t$ between the rendering start timing of the image of each frame and the warp processing start timing of the image of the corresponding frame to be less than or equal to the preset difference $\Delta t_{aim}$ comprises:

if a sum $t_0$ of the average rendering duration t1_average of the images of the M frames and the average warp processing duration t2_average of the images of the M frames is less than or equal to $$\frac{1}{fps},$$

where fps is the system frame rate, setting the rendering start timing of the image of each frame to be the same as a receiving timing of a corresponding vertical sync signal, and setting the warp processing start timing of the image of each frame to make the difference Δt between the rendering start timing of the image of each frame and the warp processing start timing of the image of the corresponding frame greater than or equal to the average rendering duration t1_average of the images of the M frames and less than or equal to the preset difference $Δt_{aim}$, where $$Δt_{aim} = \frac{1}{fps} - t2\_average;$$

and
if the sum $t_0$ of the average rendering duration t1_average of the images of the M frames and the average warp processing duration t2_average of the images of the M frames is greater than $$\frac{1}{fps},$$

setting the rendering start timing of the image of each frame to be the same as the receiving timing of the corresponding vertical sync signal, and setting the warp processing start timing of the image of each frame to make the difference Δt between the rendering start timing of the image of each frame and the warp processing start timing of the image of the corresponding frame greater than or equal to the average rendering duration t1_average of the images of the M frames and less than or equal to the preset difference $Δt_{aim}$, which is smaller than Δt_average, where Δt_average is an average value of a plurality of differences, each of which is a difference between the rendering start timing of each of the images of the M frames and the warp processing start timing of a corresponding frame of the images of the M frames, or
wherein prior to the controlling the difference Δt between the rendering start timing of the image of each frame and the warp processing start timing of the image of the corresponding frame to be less than or equal to the preset difference $Δt_{aim}$ the image processing method further comprises:
acquiring an average rendering duration t1_average of the images of the M frames to be processed from the rendering durations of the images of the M frames to be processed;
obtaining warp processing durations of the images of the M frames to be processed, and acquiring an average warp processing duration t2_average of the images of the M frames to be processed from the warp processing durations of the images of the M frames to be processed;

the controlling the difference Δt between the rendering start timing of the image of each frame and the warp processing start timing of the image of the corresponding frame to be less than or equal to the preset difference $Δt_{aim}$ comprises:
if a sum $t_0$ of the average rendering duration t1_average of the images of the M frames and the average warp processing duration t2_average of the images of the M frames is less than or equal to $$\frac{1}{fps},$$

where fps is the system frame rate, setting the warp processing start timing of the image of each frame to make the difference Δt between the rendering start timing of the image of each frame and the warp processing start timing of the image of the corresponding frame greater than or equal to the average rendering duration t1_average of the images of the M frames and less than or equal to the preset difference $Δt_{aim}$, which is smaller than Δt_average, where Δt_average is an average value of a plurality of differences, each of which is a difference between the rendering start timing of each of the images of the M frames and the warp processing start timing of a corresponding frame of the images of the M frames; and
if the sum $t_0$ of the average rendering duration t1_average of the images of the M frames and the average warp processing duration t2_average of the images of the M frames is greater than $$\frac{1}{fps},$$

setting me rendering start timing of the image of each frame to be the same as the receiving timing of the corresponding vertical sync signal, and setting the warp processing start timing of the image of each frame to make the difference Δt between the rendering start timing of the image of each frame and the warp processing start timing of the image of the corresponding frame greater than or equal to the average rendering duration t1_average of the images of the M frames and less than or equal to the preset difference $Δt_{aim}$, which is smaller than Δt_average, where Δt_average is an average value of a plurality of differences, each of which is a difference between the rendering start timing of each of the images of the M frames and the warp processing start timing of a corresponding frame of the images of the M frames.

2. The image processing method according to claim 1, wherein the determining whether the rendering durations of the images of the M frames to be processed match the motion gesture requirement comprises:
determining whether the rendering durations of n % or more of the images of the M frames to be processed are less than or equal to $$\frac{1}{fps},$$

where fps is the system frame rate, and n is an integer greater than or equal to 50;

confirming that the rendering durations of the images of the M frames to be processed match the motion gesture requirement, in response to determining the rendering durations of n % or more of the images of the M frames to be processed are less than or equal to $$\frac{1}{fps};$$

confirming that the rendering durations of the images of the M frames to be processed do not match the motion gesture requirement, in response to determining the rendering durations of n % or more of the images of the M frames to be processed are not less than or equal to $$\frac{1}{fps}.$$

3. The image processing method according to claim 1, wherein subsequent to the obtaining the rendering durations of the images of the M frames to be processed and prior to the determining whether the rendering durations of the images of the M frames to be processed match the motion gesture requirement, the image processing method further comprises:
acquiring an average rendering duration t1_average of the images of the M frames to be processed from the rendering durations of the images of the M frames to be processed;
the setting the system frame rate used for a rending duration of each frame of the picture to be processed, to make the rendering duration of the image of each frame of the picture to be processed match the motion gesture requirement comprises:
enabling the system frame rate used for a rending duration of each frame of the picture to be processed to be equal with the average rendering duration t1_average of the images of the M frames to be processed, to enable the warp processing start timing of the image of each frame of the picture to be processed to be the same as a rendering end timing of the image of a corresponding frame.

4. The image processing method according to claim 3, wherein
prior to the determining whether the rendering durations of the images of the M frames to be processed match the motion gesture requirement, the image processing method further comprises: setting a system target frame rate to be equal to the average rendering duration t1_average of the images of the M frames to be processed;
the setting the system frame rate to be equal to the average rendering duration t1_average of the images of the M frames to be processed comprises:
looking up display driving parameters from a display driving parameter index table according to the system target frame rate; and
adjusting the system frame rate based on the display driving parameters to make the system frame rate equal to $$\frac{1}{t1\_average}.$$

5. The image processing method according to claim 3, wherein prior to the determining whether the rendering durations of the images of the M frames to be processed match the motion gesture requirement, the image processing method further comprises:
determining whether the average rendering duration t1_average of the images of the M frames to be processed is less than 1/K, where K is a system frame rate threshold; and
performing the determining whether the rendering durations of the images of the M frames to be processed match the motion gesture requirement, in response to determining the average rendering duration t1_average of the images of the M frames to be processed is less than 1/K.

6. The image processing method according to claim 1, wherein after the controlling the difference $\Delta t$ between the rendering start timing of the image of each frame and the warp processing start timing of the image of the corresponding frame to be less than or equal to the preset difference $\Delta t_{aim}$, or after the setting the system frame rate used for a rending duration of each frame of the picture to be processed, to make the rendering duration of the image of each frame of the picture to be processed match the motion gesture requirement, the image processing method further comprises:
updating the rendering durations of the images of the M frames to be processed.

7. An image processing apparatus, comprising:
a duration obtaining circuit, configured to obtain rendering durations of images of M frames to be processed;
a match determining circuit, configured to determine whether the rendering durations of the images of the M frames to be processed match a motion gesture requirement, wherein the motion gesture requirement represents that, in response to a user changing his/her head gesture, Virtual Reality (VR) image seen by the user will not jitter, wherein the VR image has been subject to the rendering process on the M frames to be processed;
a first modulating circuit, configured to control a difference $\Delta t$ between a rendering start timing of the image of each frame and a warp processing start timing of the image of a corresponding frame to be less than or equal to a preset difference $\Delta t_{aim}$, in response to determining the rendering durations of the images of the M frames to be processed match the motion gesture requirement; and
a second modulating circuit, configured to set a system frame rate used for a rending duration of each frame of the picture to be processed, to make the rendering duration of the image of each frame of the picture to be processed match the motion gesture requirement, in response to determining the rendering durations of the images of the M frames to be processed do not match the motion gesture requirement,
wherein the duration obtaining circuit is further configured to, prior to controlling the difference $\Delta t$ between the rendering start timing of the image of each frame and the warp processing start timing of the image of the corresponding frame to be less than or equal to the preset difference $\Delta t_{aim}$, obtain warp processing durations of the images of the M frames, acquire an average rendering duration t1_average of the images of the M frames to be processed from the rendering durations of the images of the M frames to be processed, and acquire an average warp processing duration t2_average of the images of the M frames to be processed from the warp processing durations of the images of the M frames to be processed, wherein the first modulating circuit is further configured to:

if a sum $t_0$ of the average rendering duration t1_average of the images of the M frames and the average warp processing duration t2_average of the images of the M frames is less than or equal to $$\frac{1}{fps},$$

where fps is me system name rate, set the rendering start timing of the image of each frame to be the same as a receiving timing of a corresponding vertical sync signal, and set the warp processing start timing of the image of each frame to make the difference Δt between the rendering start timing of the image of each frame and the warp processing start timing of the image of the corresponding frame greater than or equal to the average rendering duration t1_average of the images of the M frames and less than or equal to the preset difference $\Delta t_{aim}$, where $$\Delta t_{aim} = \frac{1}{fps} - t2\_average;$$

and if the sum $t_0$ of the average rendering duration t1_average of the images of the M frames and the average warp processing duration t2_average of the images of the M frames is greater than $$\frac{1}{fps},$$

set the rendering start timing of the image of each frame to be the same as the receiving timing of the corresponding vertical sync signal, and set the warp processing start timing of the image of each frame to make the difference Δt between the rendering start timing of the image of each frame and the warp processing start timing of the image of the corresponding frame greater than or equal to the average rendering duration t1_average of the images of the M frames and less than or equal to the preset difference $\Delta t_{aim}$, which is smaller than Δt_average, where Δt_average is an average value of a plurality of differences, each of which is a difference between the rendering start timing of each of the images of the M frames and the warp processing start timing of a corresponding frame of the images of the M frames, or wherein the first modulating circuit is further configured to:

if a sum $t_0$ of the average rendering duration t1_average of the images of the M frames and the average warp processing duration t2_average of the images of the M frames is less than or equal to $$\frac{1}{fps},$$

where fps is the system frame rate, set the warp processing start timing of the image of each frame to make the difference Δt between the rendering start timing of the image of each frame and the warp processing start timing of the image of the corresponding frame greater than or equal to the average rendering duration t1_average of the images of the M frames and less than or equal to the preset difference $\Delta t_{aim}$, which is smaller than Δt_average, where Δt_average is an average value of a plurality of differences, each of which is a difference between the rendering start timing of each of the images of the M frames and the warp processing start timing of a corresponding frame of the images of the M frames; and if the sum $t_0$ of the average rendering duration t1_average of the images of the M frames and the average warp processing duration t2_average of the images of the M frames is greater than $$\frac{1}{fps},$$

set the rendering start timing of the image of each frame to be the same as the receiving timing of the corresponding vertical sync signal, and set the warp processing start timing of the image of each frame to make the difference Δt between the rendering start timing of the image of each frame and the warp processing start timing of the image of the corresponding frame greater than or equal to the average rendering duration t1_average of the images of the M frames and less than or equal to the preset difference $\Delta t_{aim}$, which is smaller than Δt_average, where Δt_average is an average value of a plurality of differences, each of which is a difference between the rendering start timing of each of the images of the M frames and the warp processing start timing of a corresponding frame of the images of the M frames.

8. The image processing apparatus according to claim 7, wherein the match determining circuit is further configured to determine whether the rendering durations of n % or more of the images of the M frames to be processed are less than or equal to $$\frac{1}{fps},$$

where fps is the system frame rate, and n is an integer greater than or equal to 50.

9. The image processing apparatus according to claim 8, further comprising a state confirming circuit, configured to confirm that the rendering durations of the images of the M frames to be processed match the motion gesture requirement if the rendering durations of n % or more of the images of the M frames are less than or equal to $$\frac{1}{fps},$$

and to confirm that the rendering durations of the images of the M frames to be processed do not match the motion gesture requirement if the rendering durations of n % or more of the images of the M frames is greater than $$\frac{1}{fps}.$$

10. The image processing apparatus according to claim 7, wherein the duration obtaining circuit is further configured to acquire an average rendering duration t1_average of the images of the M frames to be processed from the rendering durations of the images of the M frames to be processed, subsequent to obtaining the rendering durations of the images of the M frames to be processed and prior to determining whether the rendering durations of the images of the M frames to be processed match the motion gesture requirement.

11. The image processing apparatus according to claim 10, wherein
the second modulating circuit is further configured to enable the system frame rate used for a rending duration of each frame of the picture to be processed to be equal with the average rendering duration t1_average of the images of the M frames to be processed, to enable the warp processing start timing of the image of each frame of the picture to be processed to be the same as a rendering end timing of the image of a corresponding frame.

12. The image processing apparatus according to claim 10, wherein the second modulating circuit is further configured to set a system target frame rate to be equal to the average rendering duration t1_average of the images of the M frames to be processed, look up display driving parameters from a display driving parameter index table according to the system target frame rate, and adjust the system frame rate based on the display driving parameters to make the system frame rate equal to $$\frac{1}{t1\_average}.$$

13. The image processing apparatus according to claim 10, further comprising:
a frame rate selecting circuit, configured to determine whether the average rendering duration t1_average of the images of the M frames to be processed is less than 1/K, where K is a system frame rate threshold, prior to determining whether the rendering durations of the images of the M frames to be processed match the motion gesture requirement; and
the match determining circuit is further configured to determine whether the rendering durations of the images of the M frames to be processed match the motion gesture requirement if the system frame rate is less than or equal to K.

14. The image processing apparatus according to claim 10, further comprising: an update control circuit configured to control the updating of the rendering durations of the images of the M frames to be processed, after controlling the difference Δt between the rendering start timing of the image of each frame and the warp processing start timing of the image of the corresponding frame to be less than or equal to the preset difference $\Delta t_{aim}$, or after setting the system frame rate to make the rendering duration of the image of each frame of the picture to be processed match the motion gesture requirement.

15. A display device, comprising an image processing apparatus as claimed in claim 7.

* * * * *